US011546770B2

(12) United States Patent
Mueck

(10) Patent No.: US 11,546,770 B2
(45) Date of Patent: Jan. 3, 2023

(54) SYSTEMS AND METHODS FOR DELIVERING RADIO APPLICATIONS TO RECONFIGURABLE RADIO EQUIPMENT

(71) Applicant: Apple Inc., Cupertino, CA (US)

(72) Inventor: Markus Dominik Mueck, Unterhaching (DE)

(73) Assignee: Apple Inc., Cupertino, CA (US)

( * ) Notice: Subject to any disclaimer, the term of this patent is extended or adjusted under 35 U.S.C. 154(b) by 725 days.

(21) Appl. No.: 16/481,289

(22) PCT Filed: Jun. 23, 2017

(86) PCT No.: PCT/US2017/039117
§ 371 (c)(1),
(2) Date: Jul. 26, 2019

(87) PCT Pub. No.: WO2018/236399
PCT Pub. Date: Dec. 27, 2018

(65) Prior Publication Data
US 2020/0336900 A1 Oct. 22, 2020

(51) Int. Cl.
*H04W 12/30* (2021.01)
*H04W 4/50* (2018.01)
(Continued)

(52) U.S. Cl.
CPC .............. *H04W 12/35* (2021.01); *G06F 8/61* (2013.01); *H04W 4/50* (2018.02); *H04W 12/03* (2021.01); *H04W 12/041* (2021.01); *H04W 12/06* (2013.01)

(58) Field of Classification Search
CPC ....... H04W 12/35; H04W 12/37; H04W 4/50; H04W 12/03; H04W 12/041; H04W 12/06; G06F 8/61
See application file for complete search history.

(56) References Cited

U.S. PATENT DOCUMENTS

| 7,366,529 | B2* | 4/2008 | Alanara | H04L 67/36 455/420 |
| 8,504,120 | B2* | 8/2013 | Zhang | H04W 52/0258 455/418 |
| 10,228,927 | B2* | 3/2019 | Choi | G06F 8/61 |
| 10,757,089 | B1* | 8/2020 | Hohler | H04L 63/0807 |

(Continued)

FOREIGN PATENT DOCUMENTS

| CN | 102016865 | 4/2011 |
| CN | 102595393 | 1/2016 |

(Continued)

OTHER PUBLICATIONS

International Patent Office—International Search Report and Written Opinion dated Sep. 27, 2017, from International Application No. PCT/US2017/039117, 15 pages.

(Continued)

*Primary Examiner* — Hosuk Song
(74) *Attorney, Agent, or Firm* — Fish & Richardson P.C.

(57) ABSTRACT

Methods, systems, and storage media for delivering radio applications to reconfigurable radio equipment (RE) for installation and implementation are described. In embodiments, an RE may transmit a request for a radio application (RA) to a RadioApp Store. The RE may receive the requested RA from the RadioApp Store when the RA is verified as being compatible with the RE and when implementation of the RA by the RE is authorized by a Declaration of Conformity (DoC) associated with the RE and/or the RA. The RE may install the RA when the DoC authorizes installation of the RA based on one or more other RAs implemented by the RE. Other embodiments may be described and/or claimed.

21 Claims, 9 Drawing Sheets

(51) Int. Cl.
*H04W 12/06* (2021.01)
*H04W 12/03* (2021.01)
*G06F 8/61* (2018.01)
*H04W 12/041* (2021.01)

(56) References Cited

U.S. PATENT DOCUMENTS

| 10,911,941 | B2* | 2/2021 | Choi | H04W 40/04 |
| 2012/0182121 | A1 | 7/2012 | Mueck | |
| 2014/0074570 | A1 | 3/2014 | Hope et al. | |
| 2017/0273068 | A1* | 9/2017 | Choi | H04B 1/0025 |

FOREIGN PATENT DOCUMENTS

| CN | 105247526 | 2/2018 |
| CN | 106134283 | 10/2019 |
| KR | 101813512 | 1/2018 |
| WO | 2005/013540 A2 | 2/2005 |

OTHER PUBLICATIONS

ETSI, "STF502 on Reconfigurable Radio System Security," RRSWG3(16)033b003, Apr. 28, 2016, 25 pages.
ETSI, "Reconfigurable Radio Systems (RRS); Security related use cases and threats in Reconfigurable Radio Systems," ETSI TR 103 087 V1.1.1 (Jun. 2016), 80 pages.
ETSI, "Reconfigurable Radio Systems (RRS); Security requirements for reconfigurable radios," ETSI TS 103 436 V1.1.1 (Aug. 2016), 37 pages.
ETSI, "Reconfigurable Radio Systems (RRS); Radio Reconfiguration related Architecture for Mobile Devices," ETSI EN 303 095 V1.2.1 (Jun. 2015), 42 pages.
ETSI, "Reconfigurable Radio Systems (RRS); Radio Reconfiguration related Requirements for Mobile Devices," Draft ETSI EN 302 969 V1.2.1 (Jul. 2014), 22 pages.
Office Journal of the European Union, "Directive 2014/53/EU of the European Parliament and of the Council," Apr. 16, 2014, 45 pages.

* cited by examiner

SYSTEMS AND METHODS FOR DELIVERING RADIO APPLICATIONS TO RECONFIGURABLE RADIO EQUIPMENT

CROSS REFERENCE TO RELATED APPLICATIONS

This application is a national phase entry under 35 U.S.C. § 371 of International Application No. PCT/US2017/039117, filed Jun. 23, 2017, entitled "SYSTEMS AND METHODS FOR DELIVERING RADIO APPLICATIONS TO RECONFIGURABLE RADIO EQUIPMENT," the entire contents of which is hereby incorporated by reference in its entirety.

FIELD

Various embodiments of the present application generally relate to the field of wireless communications, and in particular, to delivering radio applications to reconfigurable radio equipment for installation and implementation.

BACKGROUND

Currently, many regulatory bodies, such as the Federal Communications Commission (FCC) in the United States and the European Telecommunications Standards Institute (ETSI) in the European Union (EU), may require radio equipment (RE) manufacturers to provide documentation showing that their REs comply with regulatory and/or legal standards. For example, in the regulatory framework of the EU, a Declaration of Conformity (DoC) is a document provided with an RE in which a manufacturer declares that it has assessed compliance with all EU Acts governing the RE. In its digital form, the DoC content can be displayed but its semantic remains opaque to the RE. However, the DoC may contain a machine-readable annex for the RE to determine compliance of a hardware and software combination.

A Radio Reconfigurable System (RRS) is a computer device/system that is capable of communicating information using electromagnetic waves that also includes reconfigurable radio technology. RRS is a generic concept based on technologies such as Software (SW) Reconfiguration through Radio Applications (RAs) and Cognitive Radio (CR) whose systems exploit the capabilities of reconfigurable REs and networks for self-adaptation to dynamically-changing environments with the aim of improving supply chain, equipment, and spectrum utilization. RAs are applications ("apps") that may access low-level parameters of REs in order to update or otherwise alter how the RE uses its radio technology. SW Reconfiguration through RAs is an extension of the app store concept used for most mobile device platforms, such as smartphones and tablet computers, where a user may access an RA through an app store interface to download and install RAs.

For a typical RRS, a single DoC is issued for a particular type of RE. The DoC may be issued based on the RE platform and/or version of the RE platform. However, since DoCs are not issued for individual RAs, SW Reconfiguration through RAs may leave REs susceptible to malicious attacks via malware and/or enable illegally copying and dissemination of proprietary RAs.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
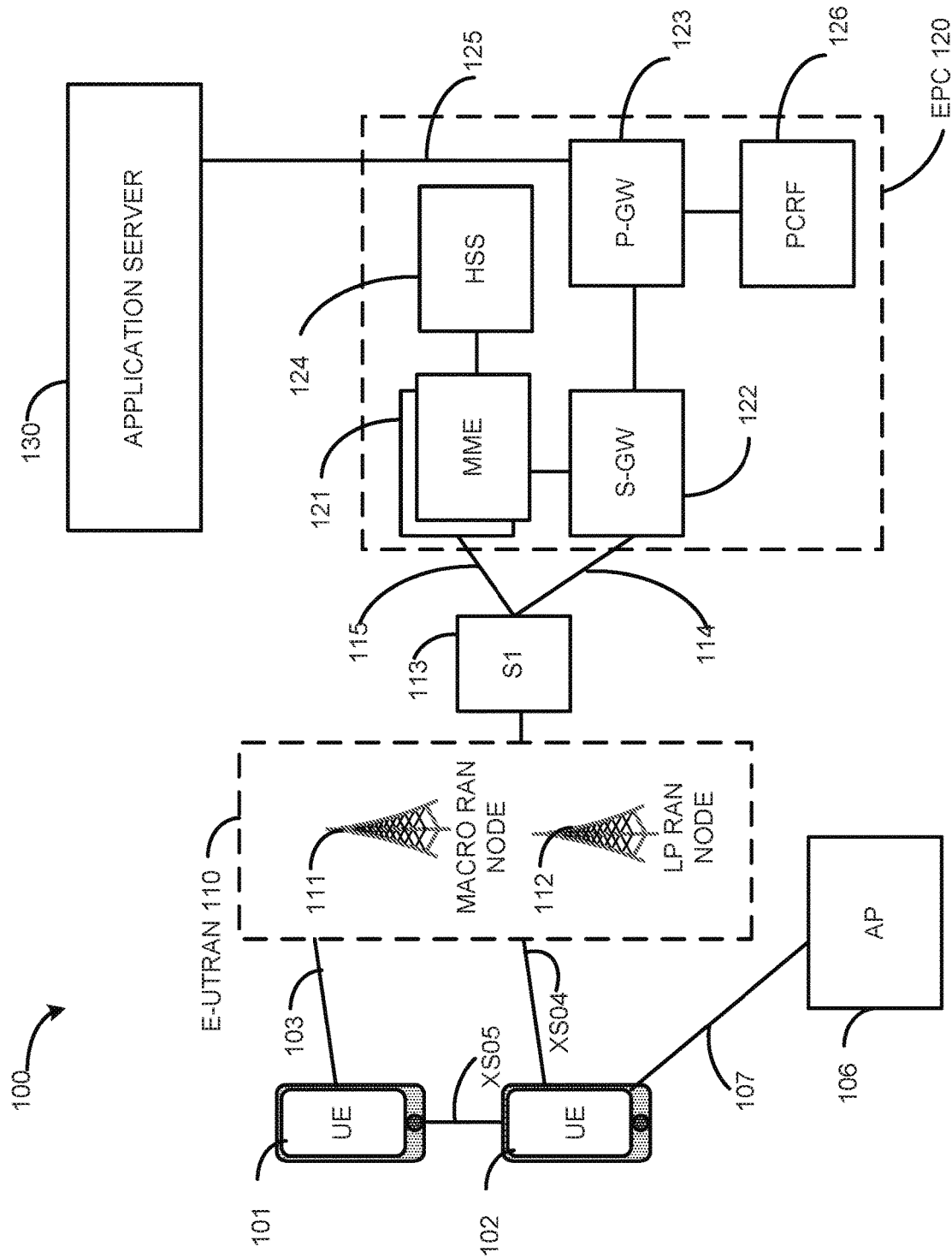
FIG. 1 illustrates an architecture of a system of a network, in accordance with various embodiments.

Embodiments discussed herein relate to reconfiguration of radio equipment (REs) using radio applications (RAs). Disclosed embodiments provide mechanisms for delivering RAs to REs for installation and implementation. In embodiments, an RE may transmit a request for a radio application (RA) to a RadioApp Store. The RE may receive the requested RA from the RadioApp Store when the RA is verified as being compatible with the RE and when implementation of the RA by the RE is authorized by a Declaration of Conformity (DoC) associated with the RE and/or the RA. The RE may install the RA when the DoC authorizes installation of the RA based on one or more other RAs implemented by the RE. Other embodiments may be described and/or claimed.

In embodiments, a computer device (or multiple computer devices) may be employed as a radio application store (RadioApp Store). The computer device may receive a request for an RA or a radio application package (RAP) from an RE. The computer device may determine whether the requested RA/RAP is compatible with the RE and/or whether the requested RA/RAP is authorized by a DoC to be installed and/or operated by the RE in combination with one or more other RAs or RAPs. The DoC may be associated with the requesting RE or the RA/RAP. Other embodiments may be described and/or claimed.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like are used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like).

As used herein, the term "radio equipment" may refer to a device with radio communication capabilities. As used herein, the term "reconfigurable radio equipment", "reconfigurable mobile device", and the like, may refer to radio equipment capable of supporting radio reconfiguration, including software-based radio reconfiguration and/or hardware-based radio reconfiguration. Any equipment may be considered to be "Reconfigurable Equipment" even if only limited reconfiguration is possible, for example, through firmware upgrades. The term "radio equipment", "reconfigurable radio equipment", "reconfigurable mobile device", and the like, may be considered synonymous to, and may hereafter be occasionally referred to as user equipment (UE), client, mobile, mobile device, mobile terminal, user terminal, mobile unit, mobile station, mobile user, subscriber, user, remote station, access agent, user agent, receiver, etc., and may describe a remote user of network resources in a communications network. Furthermore, the term "radio equipment" may include any type of wireless/wired device such as consumer electronics devices, cellular phones, smartphones, feature phones, tablet computers, wearable computer devices, personal digital assistants (PDAs), desktop computers, and laptop computers, networked or "smart" appliances, machine-type communications (MTC) devices, machine-to-machine (M2M), Internet of Things (IoT) devices, and/or the like.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), next generation nodeB (gNB), base transceiver station (BTS), access point (AP), etc., and may describe equipment that provides the radio baseband functions for data and/or voice connectivity between a network and one or more users.

As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information. The channels, radio links, etc. discussed herein may operate according to any of the following radio communication technologies and/or standards including but not limited to a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (POMA), 3GPP Long Term Evolution (LTE), 3GPP Long Term Evolution Advanced (LTE Advanced), Code division multiple access 2000 (CDM1800), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDM1800 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, Data TAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as 3GPP Generic Access Network, or GAN standard), Zigbee, Bluetooth®, Wireless Gigabit Alliance (WiGig) standard, mm Wave standards in general (wireless systems operating at 10-300 GHz and above such as WiGig, IEEE 802.11ad, IEEE 802.1lay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communica-tions) communication systems such as Intelligent-Transport-Systems and others, etc. The embodiments discussed herein may also be applied to different Single Carrier (SC) or Orthogonal Frequency Division Multiplexing (OFDM) flavors (for example, cyclic prefix (CP)-OFDM, SC-Frequency Division Multiple Access (FDMA), SC-OFDM, filter bank-based multicarrier (FBMC), Orthogonal FDMA (OFDMA), etc.), as well as 3GPP New Radio (NR) by allocating the OFDM carrier data bit vectors to the corresponding symbol resources. Additionally, the embodiments discussed herein may be used in the context of any spectrum management scheme including dedicated licensed spectrum, unlicensed spectrum, (licensed) shared spectrum (for example, Licensed Shared Access (LSA) in 2.3-2.4 GHz, 3.4-3.6 GHz, 3.6-3.8 GHz and further frequencies and SAS=Spectrum Access System in 3.55-3.7 GHz and further frequencies). Applicable spectrum bands include International Mobile Telecommunications (IMT) spectrum (for example, 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc). Note that some bands are limited to specific region(s) and/or countries), !MT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (for example, 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc), the Intelligent Transport Systems (ITS) band of 5.9 GHz (for example, 5.85-5.925 GHz) and 63-64 GHz, bands currently allocated to WiGig such as WiGig Band 1 (for example, 57.24-59.40 GHz), WiGig Band 2 (for example, 59.40-61.56 GHz) and WiGig Band 3 (61.56-63.72 GHz) and WiGig Band 4 (for example, 63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (for example, below 790 MHz) where in particular the 400 MHz and 700 MHz bands are promising candidates. Besides cellular applications, specific applications for vertical markets may be addressed such as Program Making and Special Events (PMSE), medical, health, surgery, automotive, low-latency, drones, etc. applications. Furthermore, hierarchical applications of the embodiments discussed herein is possible, for example, by introducing a hierarchical prioritization of usage for different types of users (for example, low/medium/high priority, subscription based priorities, etc.) based on a prioritized access to the spectrum (for example, with highest priority to tier-I users, followed by tier-2, then tier-3, etc. users, etc.).

As used herein, the term "binding", "bound", and the like may refer to an association of two or more related elements of information using cryptographic techniques. The aspects of binding discussed herein are generally applicable to any type of document, declaration, statement, certification, certification marks, and/or the like, which may be provided in written form, electronic form, or any other form. As used herein, the term "Declaration of Conformity" or "DoC", may refer to a document, data structure, marking, or any other like indication that a product complies with an accepted standard and/or a claim that a manufacturer has tested the product to verify compliance with that standard. The specific specification, testing protocols/procedures, and frequency of testing may be defined by the standards organization that publishes the standard. The term "Declaration of Conformity" or "DoC" is typically used by Europe regulatory authorities, however, the embodiments discussed herein may be applicable to any similar document, declaration, statement, certification, certification marks, etc., as used by other regulatory domains.

FIG. 1 illustrates an architecture of a system 100 of a network, in accordance with some embodiments. The system 100 is shown to include radio equipment (RE) 101 and a RE 102. The REs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the REs 101 and 102 can comprise an IoT RE, which can comprise a network access layer designed for low-power IoT applications utilizing short-lived RE connections. An IoT RE can utilize technologies such as M2M or MTC for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT REs, which may include uniquely identifiable embedded computing devices (within the Internet infrastructure), with short-lived connections. The IoT REs may execute background applications (e.g., keep-alive messages, status updates, etc.) to facilitate the connections of the IoT network.

The REs 101 and 102 may be configured to connect, e.g., communicatively couple, with a radio access network (RAN)—in this embodiment, an Evolved Universal Mobile Telecommunications System (UMTS) Terrestrial Radio Access Network (E-UTRAN) 110. The REs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and/or any of the other communications protocols discussed herein.

In this embodiment, the REs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The RE 102 is shown to be configured to access an access point (AP) 106 via connection 107. The connection 107 can comprise a local wireless connection, such as a connection consistent with any IEEE 202A.11 protocol, wherein the AP 106 would comprise a wireless fidelity (WiFi®) router. In this example, the AP 106 is shown to be connected to the Internet without connecting to the core network of the wireless system (described in further detail below).

The E-UTRAN 110 can include one or more access nodes that enable the connections 103 and 104. These access nodes (ANs) can be referred to as base stations (BSs), NodeBs, evolved NodeBs (eNBs), ne2 Generation NodeBs (gNB), RAN nodes, and so forth, and can comprise ground stations (e.g., terrestrial access points) or satellite stations providing coverage within a geographic area (e.g., a cell). The E-UTRAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the REs 101 and 102. In some embodiments, any of the RAN nodes 111 and 112 can fulfill various logical functions for the E-UTRAN 110 including, but not limited to, radio network controller (RNC) functions such as radio bearer management, uplink and downlink dynamic radio resource management and data packet scheduling, and mobility management.

In accordance with some embodiments, the REs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the REs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the REs 101 and 102. The physical downlink control channel (PDCCH) may carry information about the transport format and resource allocations related to the PDSCH channel, among other things. It may also inform the REs 101 and 102 about the transport format, resource allocation, and H-ARQ (Hybrid Automatic Repeat Request) information related to the uplink shared channel. Typically, downlink scheduling (assigning control and shared channel resource blocks to the RE 102 within a cell) may be performed at any of the RAN nodes 111 and 112 based on channel quality information fed back from any of the REs 101 and 102. The downlink resource assignment information may be sent on the PDCCH used for (e.g., assigned to) each of the REs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an e2ension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The E-UTRAN 110 is shown to be communicatively coupled to a core network in this embodiment, an Evolved Packet Core (EPC) network 120 via an S1 interface 113. In this embodiment the S1 interface 113 is split into two parts, the S 1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the EPC network 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The EPC network 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the E-UTRAN 110, and routes data packets between the E-UTRAN 110 and the EPC network 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and e2ernal networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the REs 101 and 102 via the EPC network 120.

According to various embodiments, the system 100 may include multiple application servers 130 ("app servers 130") where one or more app servers 130 may provide one or more services. For example, one or more app servers 130 may provide RadioApp Store (RAS) services, which provide Radio Application Packages (RAPs) to the REs 101 and 102. A RAP may be a delivery unit of a Radio Application (RA), which may, upon execution of the RA, reconfigure the radio communications technologies of the REs 101 and/or 102. In another example, one or more app servers 130 may provide RAP/DoC provider services including services of an original equipment manufacturer (OEM), software manufacturers, and/or conformity contact entities. Such services are discussed infra.

The P-GW 123 may further be a node for policy enforcement and charging data collection. Policy and Charging Enforcement Function (PCRF) 126 is the policy and charging control element of the EPC network 120. In a non-roaming scenario, there may be a single PCRF in the Home Public Land Mobile Network (HPLMN) associated with an RE's Internet Protocol Connectivity Access Network (IP-CAN) session. In a roaming scenario with local breakout of traffic, there may be two PCRFs associated with an RE's IP-CAN session, a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
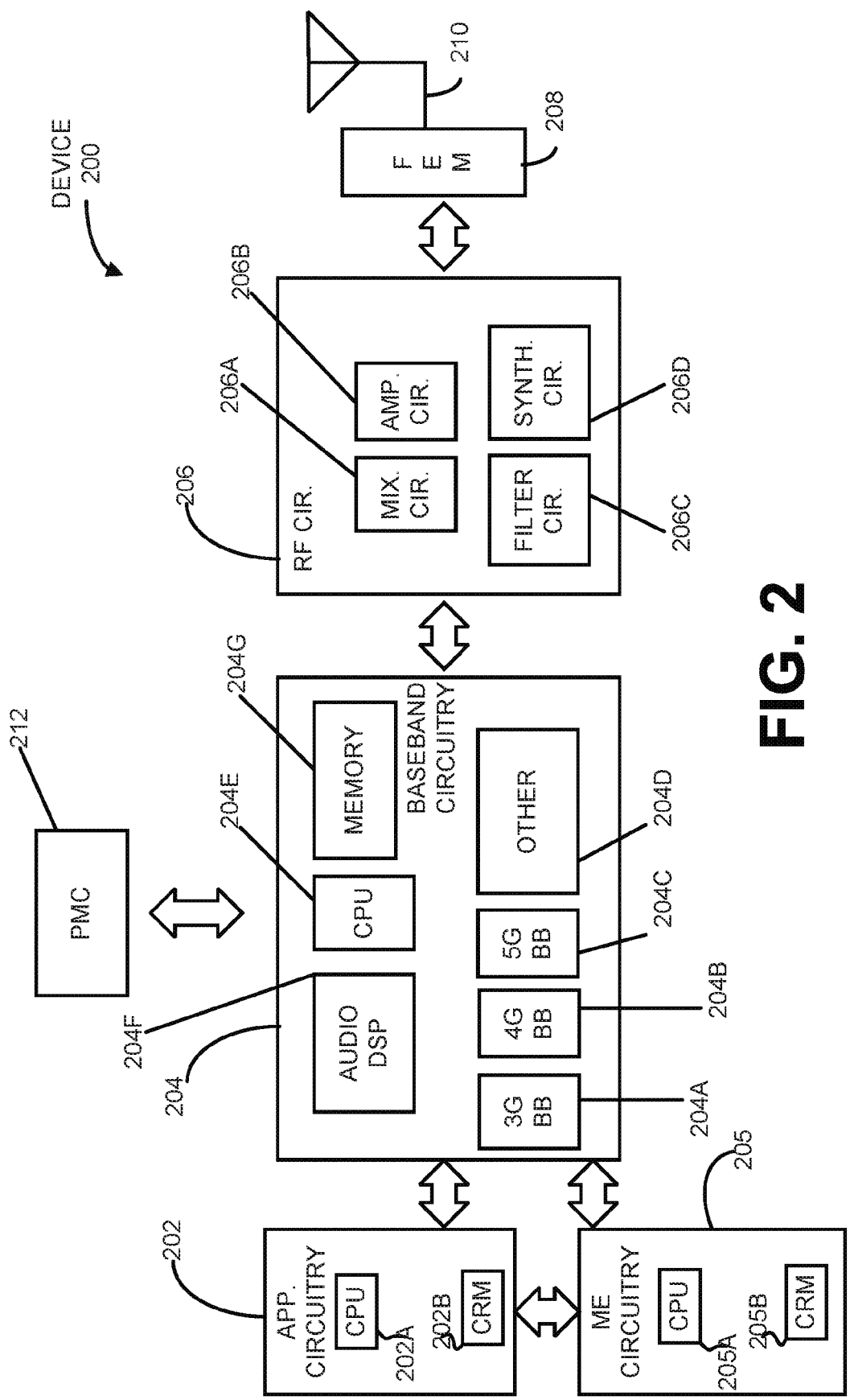
FIG. 2 illustrates example components of a device, in accordance with various embodiments.

FIG. 2 illustrates example components of a device 200 in accordance with some embodiments. In embodiments, the device 200 may be implemented in or by RE 101 and/or RE 102 of FIG. 1. In some embodiments, the device 200 may include application circuitry 202, baseband circuitry 204, Management Engine (ME) circuitry 205, Radio Frequency (RF) circuitry 206, front-end module (FEM) circuitry 208, one or more antennas 210, and power management circuitry (PMC) 212 coupled together at least as shown. The components of the illustrated device 200 may be included in a RE or a RAN node. In some embodiments, the device 200 may include less elements (e.g., a RAN node may not utilize application circuitry 202, and instead include a processor/controller to process IP data received from an EPC). In some embodiments, the device 200 may include additional elements such as, for example, network interface cards, display, camera, sensor(s), or input/output (I/O) interface. In other embodiments, the components described below may be included in more than one device (e.g., said circuitries may be separately included in more than one device for Cloud-RAN (C-RAN) implementations). The components may communicate over a suitable bus technology, such as industry standard architecture (ISA); extended ISA (EISA); peripheral component interconnect (PCI); peripheral component interconnect extended (PCIx); PCI express (PCIe); a proprietary bus, for example, used in a SoC based system; an I²C interface, an SPI interface, point to point interfaces, a power bus, or any number of other technologies.

The application circuitry 202 may include one or more application processors 202A. For example, the application circuitry 202 may include circuitry such as, but not limited to, one or more single-core or multi-core processors, a microprocessor, a multithreaded processor, an ultra-low voltage processor, an embedded processor, or other known processing element. The processor(s) 202A may include any combination of general-purpose processors and dedicated processors (e.g., graphics processors, application processors, etc.). The processors 202A may be coupled with or may include memory/storage 202B (also referred to as "computer readable media 202B" and the like) and may be configured to execute instructions stored in the memory/storage to enable various applications or operating systems to run on the device 200. In some embodiments, processors of application circuitry 202 may process IP data packets received from an EPC.

The memory/storage 202B may comprise any number of memory devices used to provide for a given amount of system memory. As an example, the memory 202B may include random access memory (RAM) in accordance with a Joint Electron Devices Engineering Council (JEDEC) double data rate (DDR) or low power double data rate (LPDDR)-based design. In various implementations, individual memory devices may be formed of any number of different package types, such as single die package (SDP), dual die package (DDP) or quad die package (Q17P), dual inline memory modules (DIMMs) such as microDIMMs or MiniDIMMs, and/or any other like memory devices. To provide for persistent storage of information such as data, applications, operating systems and so forth, the memory/storage 202B may include one or more mass-storage devices, such as a solid state disk drive (SSDD); flash memory cards, such as SD cards, microSD cards, xD picture cards, and the like, and USB flash drives; on-die memory or registers associated with the processors 202A (for example, in low power implementations); a micro hard disk drive (HDD); three dimensional cross-point (3D POINT) memories from Intel® and Micron®, etc.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), si2h generation (6G), etc.). The baseband circuitry 204 (e.g., one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SoC), an integrated circuit, or a single package.

In some embodiments, the baseband circuitry 204 may provide for communication compatible with one or more radio technologies. For example, in some embodiments, the baseband circuitry 204 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

ME circuitry 205 may be an isolated and tamper-resistant chipset, which is distinct from and generally operates independently of the processors 202A. The ME circuitry 205 may be embodied as any number of hardware, firmware, and/or software modules configured to perform security, encryption, and/or authentication functions, as described herein. In some embodiments the ME circuitry 205 may be included in a graphics controller or graphics processing unit (GPU). In some embodiments, the ME circuitry 205 may be integrated into the application circuitry 202 or the baseband circuitry 204 (e.g., a same circuit board or SoC as the modem circuitry 840, etc.). The ME circuitry 205 may additionally or alternatively include separate circuitry disposed on another circuit board or SoC that is communicatively coupled to the application circuitry 202 and/or baseband circuitry 204 via a suitable bus technology or via a separate bus, such as a private low pin count (LPC) serial bus the LPC serial bus that is not exposed to a host OS of the application circuitry 202.

ME circuitry 205 may include ME processor 205A and ME memory 205B. ME memory 205B may store a set of cryptographic algorithms or operations used for generating keys and encrypting/decrypting data. The keys may be used to encrypt/decrypt data being communicated through the ME circuitry 205, digitally sign documents, and the like. The keys may be generated based on one or more measurements of the application circuitry 202. However, any suitable algorithm or operations may be used for key generation and/or encrypting/decrypting data. ME processor 205A may be any processing device capable of executing software modules or program code independently of the processors 202A and may include tamper-resistant characteristics. ME processor 205A may include one or more microprocessors, DSPs, cryptoprocessors, secure cryptoprocessors, cryptographic accelerators, secure controllers, and/or any other suitable device. The ME memory 205B may be embodied as one or more volatile and/or non-volatile memory devices. The ME memory 205B may store various data, including software/firmware executable by the ME processor 205A and data used for the various cryptographic operations, such as program code for an ME OS, keys, and crypto operations, and/or the like.

In some embodiments, the ME OS may include firmware modules for signing and verifying certificates using a certificate signing key pair. The firmware modules may verify a digital signature of certificates using a public key of the certificate signing key pair, and the private key of the certificate signing key pair is used by the security assist server to sign the certificates. The private key of this key pair may be stored in a secure data store associated with a remote provisioning service or the security assist server, and the public key of the key pair may be maintained in memory 205B as a firmware image that cannot be changed or altered. In some embodiments, the ME OS may be any suitable OS or firmware, such as a real-time OS (RTOS) and the like.

In some embodiments, the ME circuitry 205 may operate in accordance with the International Organization for Standardization (ISO) and International Electrotechnical Commission (IEC) specification ISO/IEC 11889:2009, which defines standards for trusted computing platforms. In embodiments, the ME circuitry 205 may be a management engine provided by Intel®, a Converged Security Engine (CSE) or a Converged Security Management/Manageability Engine (CSME) provided by Intel®; Trusted Execution Technology (TXT) provided by Intel®; and/or the like. In some embodiments, the ME circuitry 205 may operate in conjunction with Active Management Technology (AMT) provided by Intel® and/or Intel® vPro™ Technology (vPro). The Intel® AMT and/or Intel® vPro™ may allow for remote provisioning of the ME circuitry 205, and remote management of the ME circuitry 205 once the ME circuitry 205 has been successfully provisioned.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the receive signal path of the RF circuitry 206 may include mixer circuitry 206a, amplifier circuitry 206b and filter circuitry 206c. In some embodiments, the transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c.

In some embodiments, the mixer circuitry 206a of the receive signal path and the mixer circuitry 206a of the transmit signal path may include two or more mixers and may be arranged for quadrature downconversion and upconversion, respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various embodiments, the amplification through the transmit or receive signal paths may be done solely in the RF circuitry 206, solely in the FEM 208, or in both the RF circuitry 206 and the FEM 208.

In some embodiments, the FEM circuitry 208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 may manage power provided to the baseband circuitry 204. In particular, the PMC 212 may control power-source selection, voltage scaling, battery charging, or DC-to-DC conversion. The PMC 212 may often be included when the device 200 is capable of being powered by a battery, for example, when the device is included in an RE, UE, etc. The PMC 212 may increase the power conversion efficiency while providing desirable implementation size and heat dissipation characteristics.

While FIG. 2 shows the PMC 212 coupled only with the baseband circuitry 204. However, in other embodiments, the PMC 2 12 may be additionally or alternatively coupled with, and perform similar power management operations for, other components such as, but not limited to, application circuitry 202, RF circuitry 206, or FEM 208.

In some embodiments, the PMC 212 may control, or otherwise be part of, various power saving mechanisms of the device 200. For example, if the device 200 is in an RRC Connected state, where it is still connected to the RAN node as it expects to receive traffic shortly, then it may enter a state known as Discontinuous Reception Mode (DRX) after a period of inactivity. During this state, the device 200 may power down for brief intervals of time and thus save power.

If there is no data traffic activity for an e2ended period of time, then the device 200 may transition off to an RRC Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state, in order to receive data, it must transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
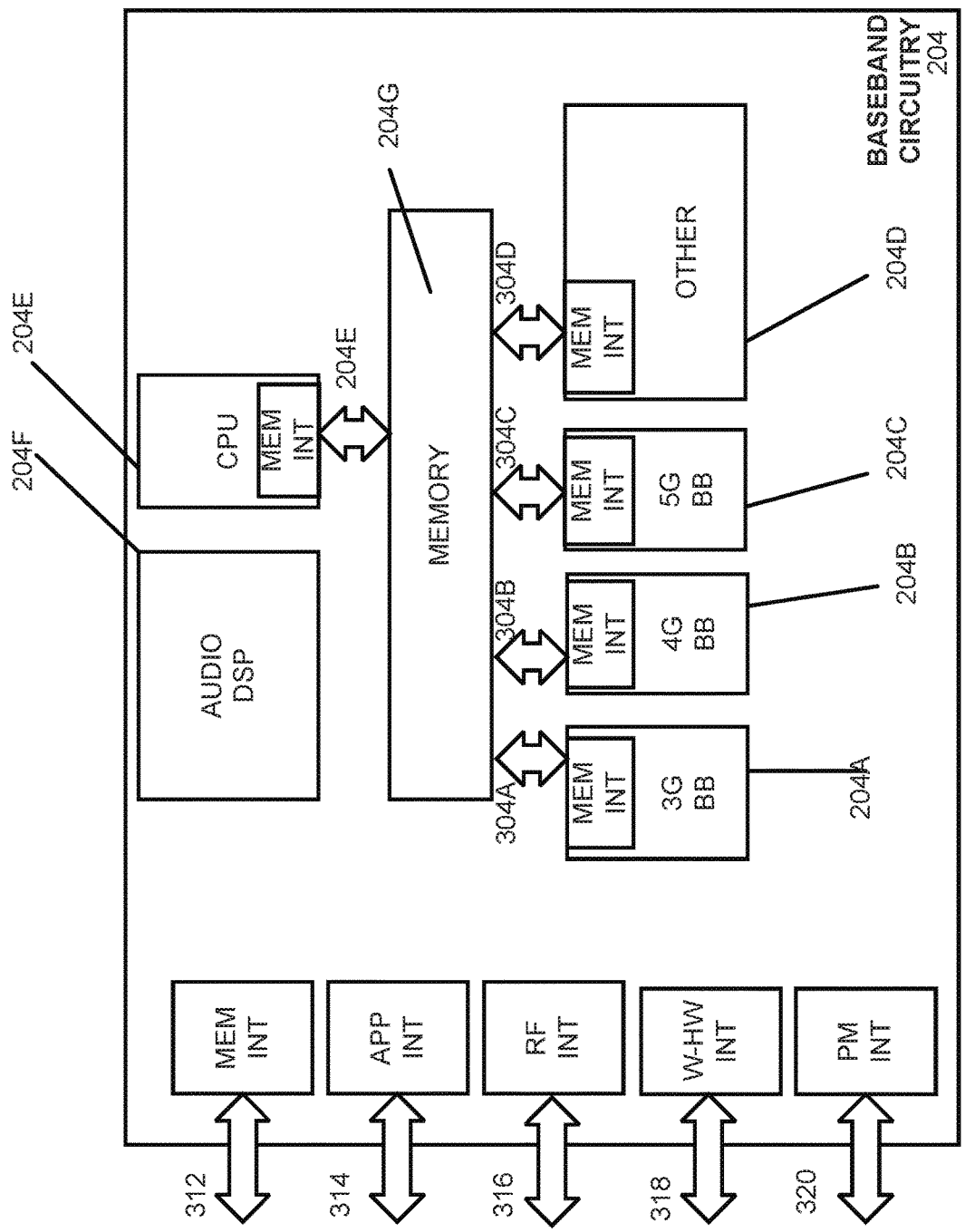
FIG. 3 illustrates example interfaces of baseband circuitry, in accordance with various embodiments.

FIG. 3 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory e2ernal to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212.

Figure 4:
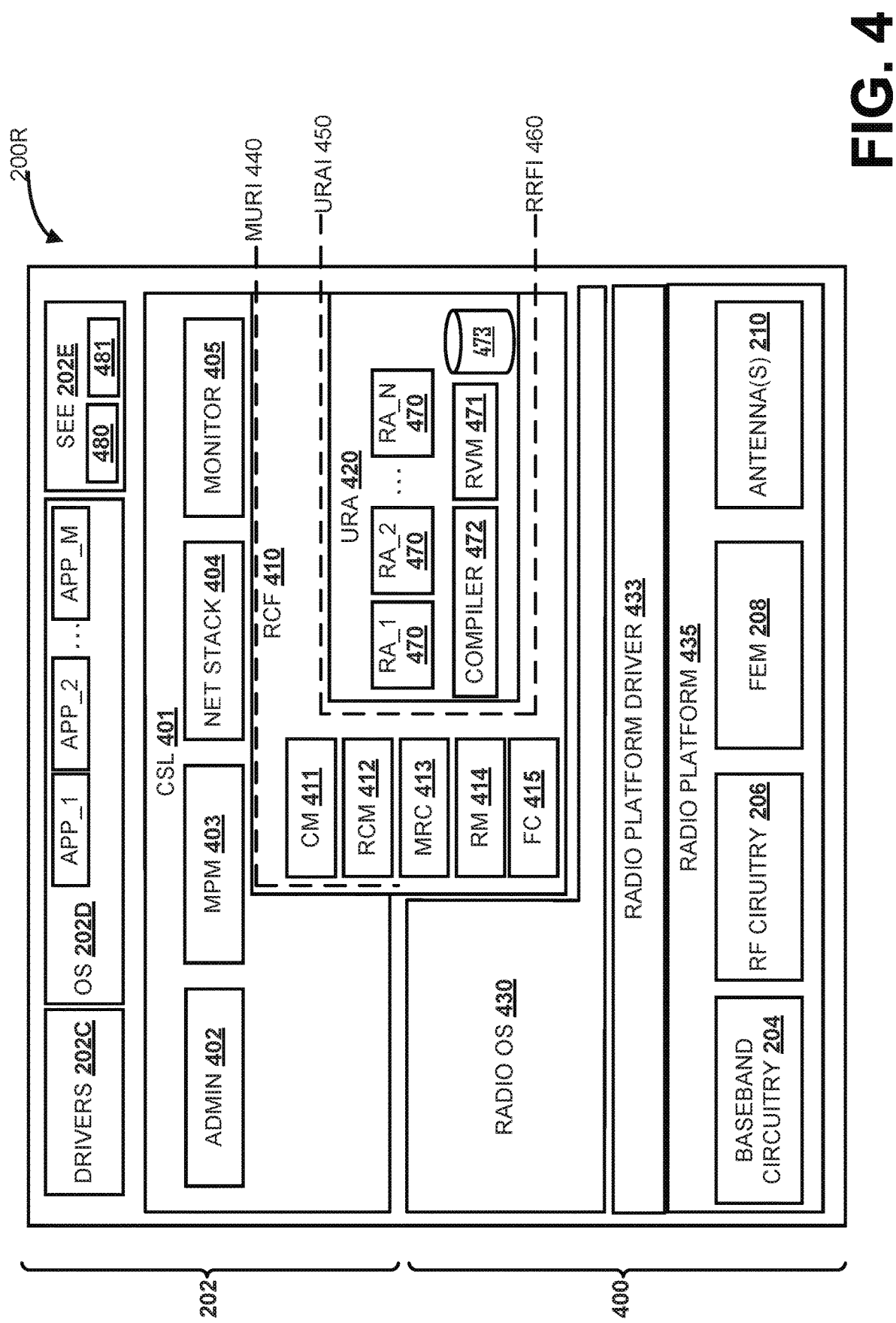
FIG. 4 illustrates an example architectural components and related entities of reconfigurable mobile device, in accordance with various embodiments.

FIG. 4 illustrates an example architectural components and related entities of reconfigurable mobile device 200R in accordance with various embodiments. Reconfigurable mobile device 200R (also referred to as "mobile device 200R", "MD 200R", "device 2005", "RE 200R", and/or the like) may be the same or similar to device 200 of FIG. 2, where like numbered items in FIG. 4 are the same or similar to items shown and described with respect to FIG. 2.

As shown, the MD 200R may include the application circuitry 202 and radio computer circuitry 400. The application circuitry 202 may include driver(s) 202C, operating system (OS) 202D, Secure Execution Environment (SEE) 202E, and Communication Services Layer (CSL) 401. The radio computer circuitry 400 may include a radio OS (ROS) 430, radio platform driver 433, and a radio platform 435. The radio platform 435 may include the baseband circuitry 204, the RF circuitry 206, the FEM 208, and the one or more antennas 210. Additionally, a Radio Control Framework (RCF) 410 and Unified Radio Application(s) (URA) 420 may be included in the application circuitry 202 and/or the radio computer circuitry 400.

Referring to the application circuitry 202, the drivers 202C may be program code that provide interfaces to hardware devices for use by the applications 1-M (where M is a number). Examples of drivers 202C may include display drivers, sensor drivers, audio drivers, USB drivers, modem circuitry drivers, NFC drivers, and network interface card drivers, a connection manager driver, and/or any other like drivers. The drivers 202C may be implemented as libraries or application programming interfaces (APIs), which allow application developers to use desired ones of the various software modules and/or software components of the libraries/APIs such that their applications may interact with hardware elements of MD 200R.

OS 202D may manage computer hardware and software resources and provide common services for various applications, such as user applications 1-M (for example, app_1, app_2, app_3, . . . app_M as shown by FIG. 4), where M is a number. The OS 202D may be a general purpose operating system or an operating system specifically written for and tailored to application circuitry 202 and/or the device 200R. The OS 202D may control execution of the various elements of the CSL 410. Additionally, the OS 202D may control execution of one or more RAs 470 (or portions thereof), such as RA_1 to RA_N (where N is a number) of the URA 420.

SEE 202E (also referred to as a "trusted execution environment" or "TEE") may be one or more hardware devices and/or one or more software modules that carry out secure operations and/or control the storage and use of personal and/or confidential data. In implementations where the SEE 202E is implemented as one or more software modules, the software modules may include "enclaves" (also referred to as "secure enclaves"), which may be isolated regions of code and/or data within the memory 202B of the application circuitry 202. In such embodiments, the enclave including the modem manager 520 may be referred to as a "DoC enclave" and the like. Only code executed within a secure enclave may access data within the same secure enclave, and the secure enclave may only be accessible using the secure application. The secure application may be operated by the application processor 202A or a tamper-resistant microcontroller (for example, the ME processor 205A). The secure enclaves may be defined using the Intel® Software Guard Extensions (SGX). The SEE 202E may also include a secure storage (not shown), which may include one or more databases (DBs) implemented by the memory 202B of the device 200R. The one or more DBs may be associated with one or more applications that enable querying of the secure storage and/or storage of information in the secure storage using any suitable database query language.

In some implementations, SEE 202E may be implemented as a physical hardware device that is separate from other components of the MD 200R. In such embodiments, SEE 202E may comprise a secure-embedded controller, such as a tamper-resistant microcontroller with embedded processors and memory devices. In some implementations, the tamper-resistant microcontroller may be part of a Universal Integrated Circuit Card (UICC) or embedded (eUICC) of the device 200R. In other implementations, the tamper-resistant microcontroller may be the ME processor 205A of the ME circuitry 205 discussed previously. In such embodiments, applications that are not within the SEE 202E may communicate with ME circuitry 205 via secure application that may also be implemented by the ME circuitry 205.

As shown, the SEE 202E may include a DoC cryptographic hash 480 (also referred to as "hashcode 480" and the like) and/or a DoC 481. The hashcode 480 may be calculated using a Secure Hash algorithm (SHA) defined in Federal Information Processing Standards Publication (FIPS) 186-4, Secure Hash Standard or as updated by the FIPS 202 SHA-3 Standard: Permutation-Based Hash and Extendable-Output Functions. Any other suitable algorithm/function may be used in other embodiments. The calculated hash 480 may be distinct from the DoC 481 and may be stored in a secured enclave of the SEE 202E. In this way, strict access control may be provided to ensure that updates to the DoC 481 by an authorized party are performed without update of the hashcode 480. The delta between versions of the DoC 481 may be recorded in such a way that all changes to the DoC 481 are recorded with various parameters, such as a timestamp of the change, a signed hash of the original document, a signed hash of the revised document, identify of the authorized party making the change (included within the digital signature for PDF documents), difference record of the changes made between versions (including all formatting and text changes), attestation of the revised DoC 481 by the final author, and/or other like parameters. In some embodiments, the DoC 481 itself may be stored by the RE 200R (for example, within the secure storage and/or secure enclave of the SEE 202E), or the DoC 481 may be obtained from a remote computing system where the RE 200R provides a pointer or location ID, for example, a pointer to a website and the like.

The DoC 481 may be a data structure, such as an attribute signature, which identifies the components of the RE 200R, by model type, to which it applies. The set of data indicated by the DoC 481 may be authenticated by a DoC signature, and thus, may bind the DoC 481 to the device 200R. Additionally, the RE ID (for example, a serial number) may be used as a nonce when storing the DoC 481 in a secure enclave of the RE 200R. According to various embodiments, the DoC 481 may indicate approved RAs 470 for various types of REs 200R (for example, a device type or model, platform type, etc.) and/or for various RE 200R instances (for example, an individual device types or models out of all manufactured devices/models of that type). In various embodiments, the set of data indicated by the DoC 481 may be authenticated by the DoC signature, and thus, may bind the DoC 481 to individual RAs 470. Typically, each RA 470 is identified by an RA identifier (ID) number, a hashcode 480 identifying that the RA 470 was not altered during the delivery/provisioning process, and source information (for example, a digital signature of the RAP/DoC provider entity, a digital signature of the RAS, etc.). In some embodiments, the DoC 481 may describe the installation requirements of a RAP (for example, RAP metadata) against the capabilities of the RE 200R and prohibit installations where a mismatch is identified. For example, the DoC 481 may include a list indicating all approved and/or available RAs 470 for particular REs 200R or RE types, approved combinations one or more RAs 470 for particular REs 200R or RE types, and/or an approved installation order of individual RAs 470 (for example, first installing RA_1 470 and then installing RA_2 may be permitted, but not vice versa) for particular REs 200R or RE types. Additionally, each copy of the DoC 481 may be marked in such a way to indicate whether it is a master, a copy, or an element of a DoC 481, as well as where the DoC 481 has been generated, by whom, and for which equipment (or combination of equipment).

Referring back to FIG. 4, the CSL 401 may provide communication services to support generic applications and multi-radio applications. The CSL 401 may include an administrator entity 402 ("admin 402"), a Mobility Policy Manager entity 403 ("MPM 403"), a networking stack entity 404 ("net stack 404"), and a monitor entity 405 ("monitor 405"). The admin 402 may request installation or uninstallation of URA 420, and create or delete instances of URA 420. This may include provisioning information about the URA 420, URA 420 statuses, and/or other like URA-related information. In some embodiments, the admin 402 may include an Administrator Security Function (ASF) that is responsible for direct and indirect interactions related to security with the RadioApp Store and other security related entities associated with the RadioApp Store. The admin 402 may also provide appropriate storage and management functions for the provisioning of the DoC in the RE 200R. The MPM 403 may monitor radio environments and mobile device (MD) capabilities. The radio environment and MD capabilities may be used to request activation or deactivation of the URA 420, and used to provide information about the URA 420 (for example, information about URA 420 lists). The MPM 403 may also select different RATs, and discover peer communication equipment and arrangement of associations. The net stack 404 may control transmission and receipt of user data. The monitor 405 may transfer information from URA 420 to user or proper destination entities in the MD.

The URA 420 may comprise one or more RAs 470, and a plurality of RAs 470 may be referred to as URA 420 when the RAs 470 exhibit common attributes, characteristics, or requirements related to the reconfiguration of the MD 200R. As used herein, URA 420 may be used interchangeably with RA 470. The RAs 470 may also be referred to as "RA components", "RRS components", and the like. The services provided by the URA 420 may be related to activation and deactivation, peer equipment discovery, and/or maintenance of communication over user data flows, which may be provided at the Unified Radio Application Interface (URAI) 450 interface between the URA 420 and the RCF 410. In some cases, these services may be provided to the CSL 401 via a Multi-radio Interface (MURI) 440 between the RCF 410 and the CSL 401.

The RAs 470 may be applications that, when executed by one or more processors (for example, one or more processors of the baseband circuitry 204) may control generation and transmission of transmit (Tx) RF signals, control receipt of receive (Rx) RF signals, and the decode the Rx RF signals. The RAs 470 may be executed/operated in a radio virtual machine (RVM) 471 that is part of the radio platform 435.

The RVM 471 may be a controlled execution environment that allows RAs 470 to access low-level radio parameters. The RVM 471 may be an abstract machine independent of the hardware, which is capable of executing configcodes. In some implementations, the RVM 471 may be an abstract machine that can be configured by configcodes into an RA 470. The implementation of the RVM 471 is radio computer-specific and may include a compiler 472 (for example, a front-end compiler or back-end compiler), which may provide Just-in-Time (JIT) or Ahead-of-Time (AOT) compilation of configcodes into executable codes.

The RAs 470 may have different forms of representation including, for example, source codes (also referred to as "RA codes"), intermediate representations (IRs), and executable codes for a particular radio platform. The RAs 470 may comprise RA codes including of User Defined Functional Blocks (UDFBs), Standard Functional Blocks (SFBs), radio controller (RC) codes, and/or executable codes depending on the RA design choice. In some implementations, an RA 470 may be expressed as a set of interconnecting SFBs together with one or more UDFBs. In some implementations, a radio library 473 may include some or all of the SFBs, and the SFBs to be provided from the radio library 473 may be represented in a platform-independent normative language. The native implementation of the radio library 473 may be provided as platform-specific codes of the SFBs for the radio platform 435. The radio library 473 may be located in the radio computer circuitry 400, and in some implementations, the radio library 473 may be a part of the RVM 471. The RC codes may be used to send context information to the monitor 405 and send/receive data to/from the net stack 404. The RC codes may be executed in a non-real-time environment (for example, the application circuitry 202), and the remaining portion of the RAs 470 may be executed in the real-time environment (for example, the radio platform 435).

Compiling the source codes of an RA 470 may yield configcodes. When an RA provider develops high level code based on a target platform (for example, radio platform 435), a result of compiling the RA source codes or URA codes is configcodes that is executable on the target platform (for example, radio platform 435). In addition, the RE 200R may support different types of RA source codes or URA codes wherein some RAs 470 and/or URA 420 may run directly on the ROS 430 as executable codes while others may run as an RVM 471 configured by configcodes. When the RA provider develops high level code without considering a target platform, a result of front-end compiling of RA 470 source codes is an IR, which may be back-end compiled for operating on a specific target platform. In this case, the configcodes may be configuration codes of an RVM 471 instance. Back-end compilation may occur within the radio computer circuitry 400 or by a cloud computing service.

Figure 6:
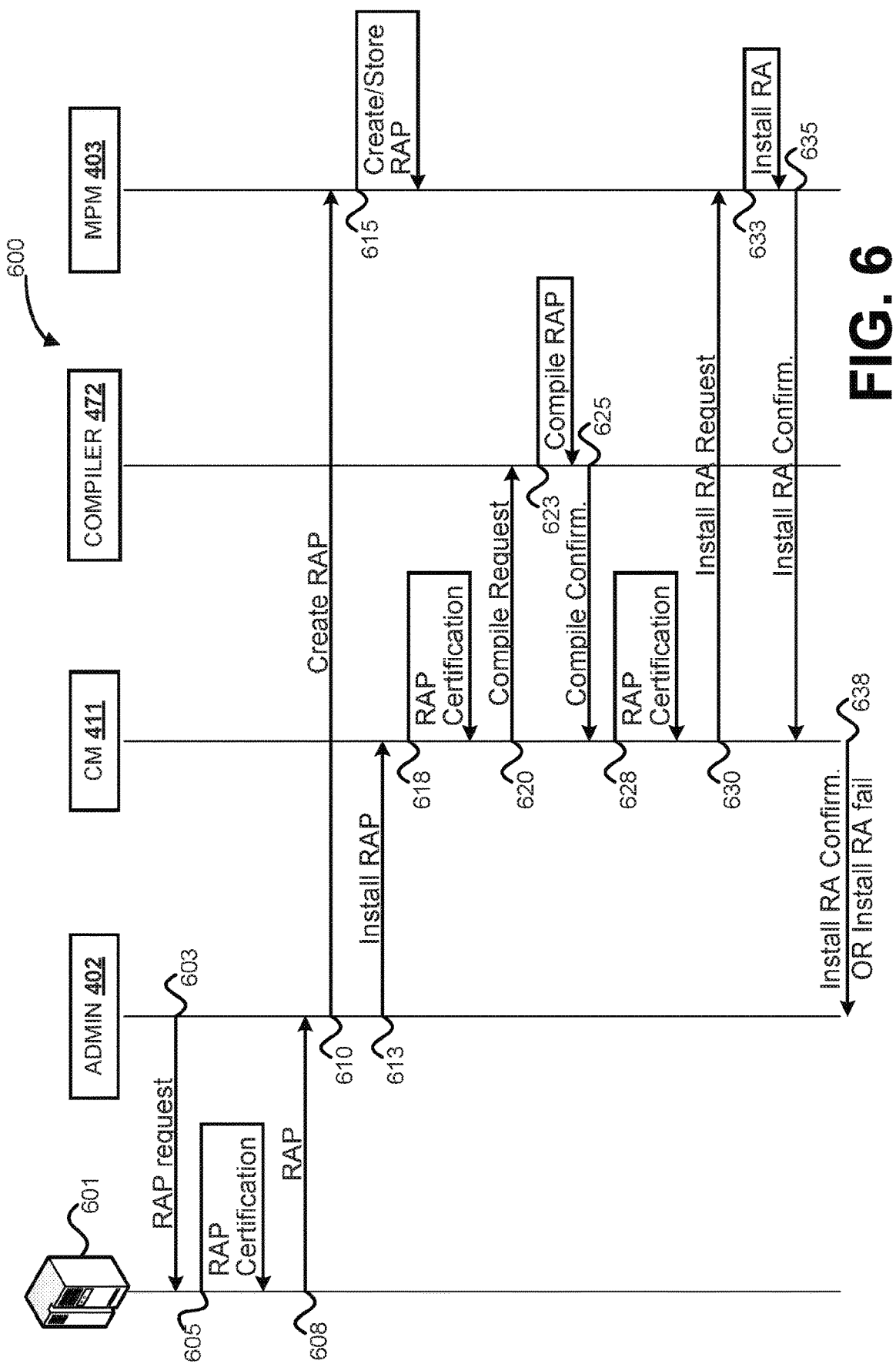
FIG. 6 illustrates an example process for downloading and installing a radio application package, in accordance with various embodiments.

According to various embodiments, an RA provider may generate a Radio Application Package (RAP), which may be a delivery unit of an RA 470 from a RadioApp Store (for example RadioApp Store 601 shown and described with regard to FIG. 6) to the RE 200R. As used herein, the term "RAP" may be used interchangeably with RA 470 and may be referred to as RAP 470. A RAP may include RA codes of an RA 470 and configuration metadata for the RE 200R. The metadata may include radio programming interface (RPI) information, which is a descriptive interface detailing how the RA 470 is structured and how its sub-components are synchronized together; bindings to the hardware abstraction layer (HAL), when applicable; bindings to linkable libraries, when applicable; and a pipeline configuration. RAPs may be provided to the RadioApp Store via the RPI, and the MD 200R may request and download RAPs generated by an RA provider from the RadioApp Store via a predetermined link. According to various embodiments, the configuration metadata may include a DoC that is associated with the RE 200R and also indicates installation parameters of the RA component 470 included in the RAP. In other embodiments, the DoC may be separate from the RAP, but provided to the MD 200R in a same digital signature as the RAP. In other embodiments, the DoC may be access from a remote resource.

In some implementations, the MD 200R may compile a RAP 470 to generate executable code for the radio platform 435. In such implementations, URA configcodes may be downloaded to the radio computer circuitry 400 in the form of source code or IR, and may be transformed into corresponding executable code through the compiler 472. Where URA configcodes are source codes or IR, the source codes or IR may be compiled at a MD 200R or compiled by a cloud computing service. When the compilation process is performed by a cloud computing service (not within the radio computer), the URA configcodes may be downloaded into the radio computer circuitry 400 in the form of executable code as a result of the compilation at the cloud (not shown). In this case, the compiler 472 and radio library 473 may not be included in the device 200R, and instead, the vendor of the radio platform 435 may provide the compiler 472 and the radio library 473 at the cloud in accordance with the radio platform 435.

Referring back to FIG. 4, the RCF 410 may be connected to the CSL 401 via a Multi-radio Interface (MURI) 440, where the RCF 410 may provide services to the CSL 401 via the MURI 440. The RCF 410 may provide a generic environment for the execution of URA 420, and a uniform way of accessing the functionality of the radio computer circuitry 400 and individual RAs 470. The RCF 410 may represent functionalities provided by the radio computer circuitry 400, and may require the RAs 470 to be subject to a common reconfiguration, multiradio execution, and resource sharing strategy framework depending on the concerned MD reconfiguration class (MDRC).

As shown, the RCF 410 may include a Configuration Manager entity 411 ("CM 411"), a Radio Connection Manager entity 412 ("RCM 412"), a Flow Controller entity 415 ("FC 415"), a Multiradio Controller entity 413 ("MRC 413"), and a Resource Manager entity 414 ("RM 414"). The CM 411 may install/uninstall and create/delete instances of URA 420 as well as manage and access the radio parameters of the URA 420. As used herein, the terms "instantiate", "instantiation", and the like may refer to the creation of an instance, and an "instance" may refer to a concrete occurrence of an object, which may occur, for example, during execution of program code. Installing or creating instances of URA 420 may be done according to known procedures, and may include creating required objects of the URA 420, compiling source codes, configcodes, etc., obtaining metadata, generating security keys, obtaining data, or the like. Uninstalling or deleting the instances of the URA 420 may be done according to known procedures, and may include removing all of the metadata, security keys, data, etc. that were used during the installation/creation procedures.

The RCM 412 may activate/deactivate URA 420 according to user requests, and manage user data flows, which can also be switched from one RA 470 to another RA 470. The FC 415 may send and receive user data packets and control the flow of signaling packets. The MRC 413 may schedule requests for radio resources issued by concurrently executing URA 420, and may detect and manage the interoperability problems among the concurrently executed URA 420. The RM 414 may manage the computational resources, and share them among simultaneously active URA 420, and guarantee their real-time execution. The RCF 410 and URA 420 may be connected to one another via the URAI 450, and the URA 420 and radio platform 435 may be connected to one another via a Reconfigurable Radio Frequency Interface (RRFI) 460. The five entities of the RCF 410 may be classified into two groups, where a first group relates to real-time execution (for example, within the ROS 430) and a second group relates to non-real-time execution (for example, within the OS 202D). The particular entities of the RCF 410 that relate to real-time and non-real-time execution can be vendor and/or implementation-specific.

The radio platform 435 may comprise hardware capable of generating and transmitting RF signals and/or receiving RF signals. The radio platform 435 may include the baseband circuitry 204, the RF circuitry 206, the FEM 208, and the one or more antennas 210. In embodiments, one or more of the aforementioned components may form an RF transceiver. In embodiments, the radio platform 435 may include fixed/dedicated hardware and/or programmable hardware. In some embodiments, the radio platform 435 (for example, the baseband circuitry 202) may include different processing elements, such as fixed accelerators (for example, ASICs), or reconfigurable accelerators (for example, FPGAs or other like FPD), and/or the like. The radio platform driver 433 may be a hardware driver used by the ROS 430 to access hardware elements of the radio platform 435.

The ROS 430 may be an operating system that performs operations of the radio computer circuitry 400, and supports real-time operations of URA 420. In embodiments, operations of the application circuitry 202 may be performed by OS 202D, which may be on a non-real-time basis. The ROS 430 may be any suitable OS or firmware, such as a real-time operating system (RTOS). In some embodiments, the ROS 430 may be a proprietary OS specifically tailored for the radio platform 435.

Figure 7:
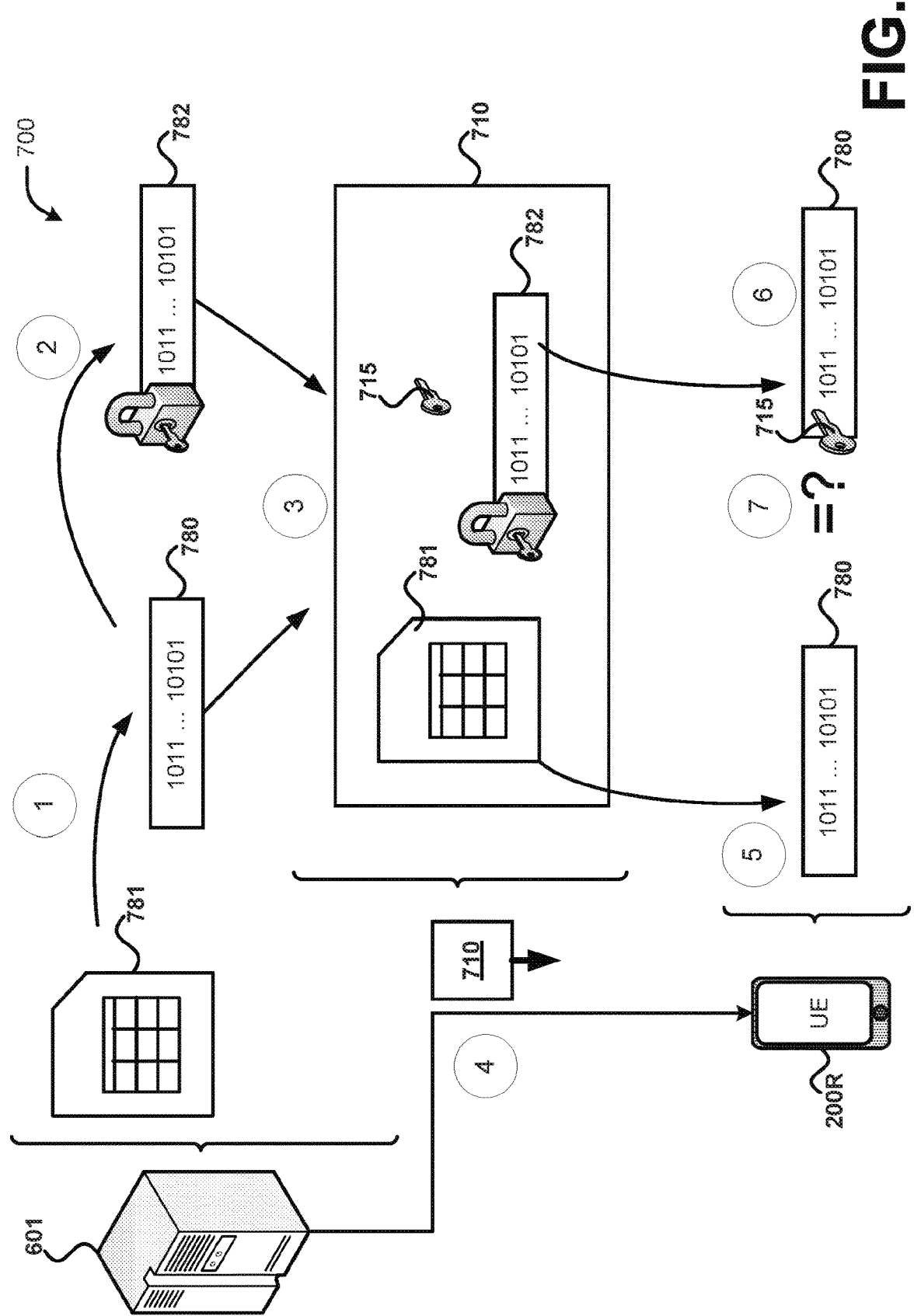
FIG. 7 illustrates an example process for creating a digital signature, and authenticating and verifying the digital signature, in accordance with various embodiments.
Figure 8:
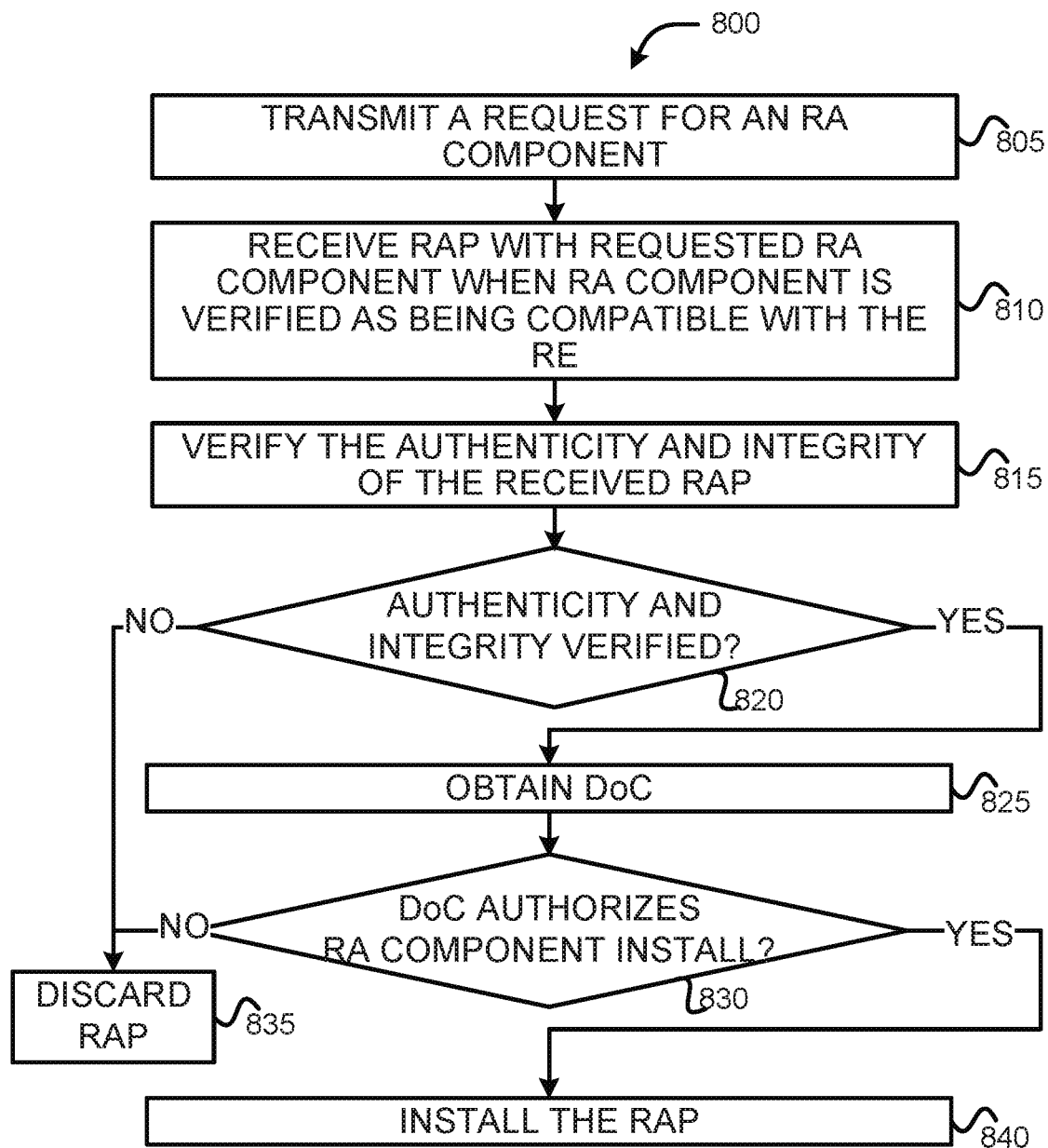
FIG. 8 illustrates an example process for obtaining and installing a radio application package, in accordance with various embodiments.

The RE 200R of FIG. 4 (or parts thereof) may be configured to perform the processes described herein (or parts thereof), such as the processes shown and described with regard to FIGS. 6-8.

Figure 5:
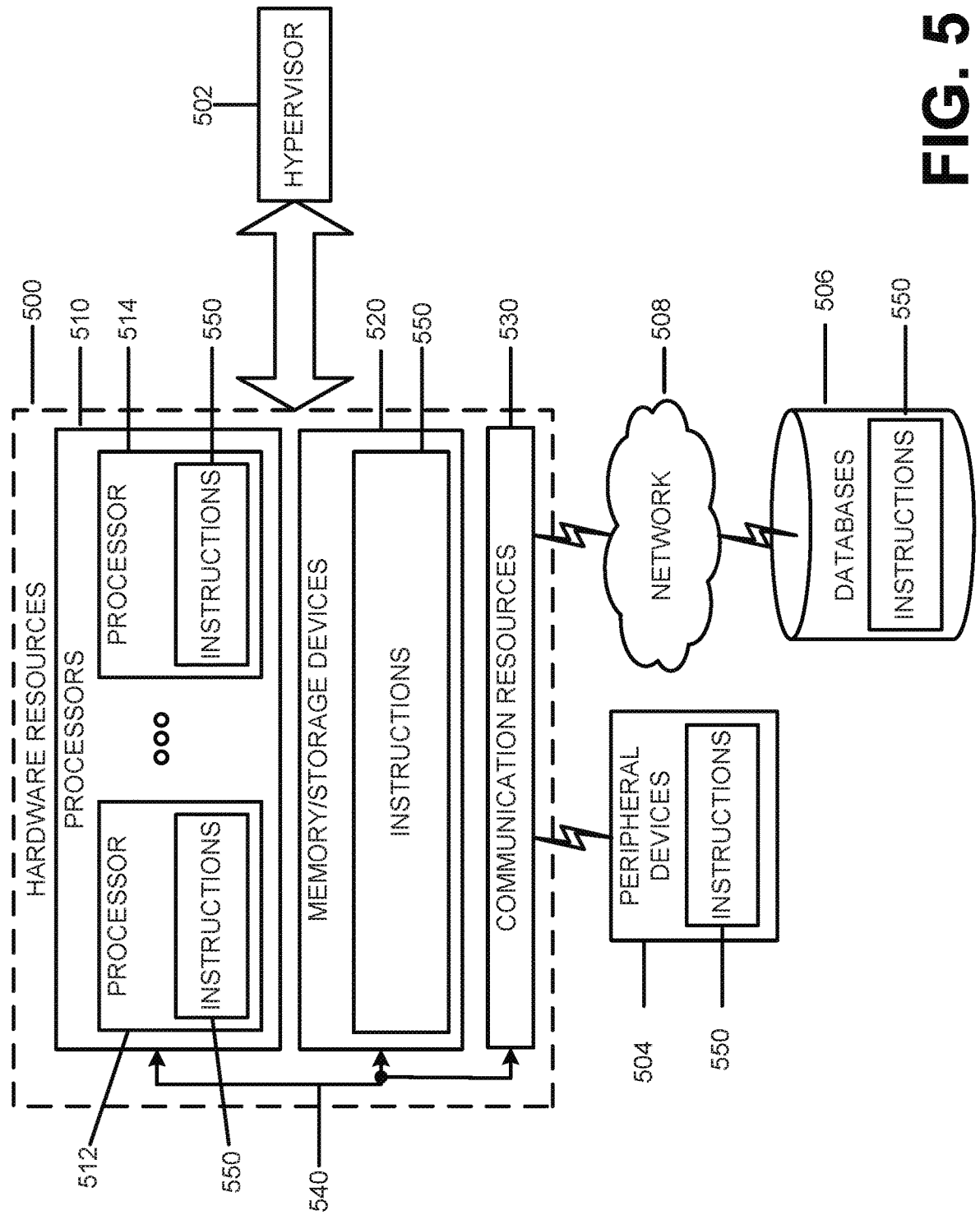
FIG. 5 illustrates a block diagram illustrating components, according to various embodiments, able to read instructions from a machine-readable or computer-readable medium (e.g., a non-transitory machine-readable storage medium) and perform any one or more of the methodologies discussed herein.

FIG. 5 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 5 shows a diagrammatic representation of hardware resources 500 including one or more processors (or processor cores) 510, one or more memory/storage devices 520, and one or more communication resources 530, each of which may be communicatively coupled via a bus 540. For embodiments where node virtualization (e.g., NFV) is utilized, a hypervisor 502 may be executed to provide an execution environment for one or more network slices/sub-slices to utilize the hardware resources 500.

The processors 510 (e.g., a central processing unit (CPU), a reduced instruction set computing (RISC) processor, a complex instruction set computing (CISC) processor, a graphics processing unit (GPU), a digital signal processor (DSP) such as a baseband processor, an ASIC, a radio-frequency integrated circuit (RFIC), another processor such as any of the circuitry discussed herein, or any suitable combination thereof) may include, for example, a processor 512 and a processor 514.

The memory/storage devices 520 may include main memory, disk storage, or any suitable combination thereof. The memory/storage devices 520 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, and/or any other memory device discussed herein, or combinations thereof.

The communication resources 530 may include interconnection or network interface components or other suitable devices to communicate with one or more peripheral devices 504 or one or more databases 506 via a network 508. For example, the communication resources 530 may include wired communication components (for example, Universal Serial Bus (USB) host controllers and receptacles/plugs for coupling via USB, network interface cards/controllers and ports/connectors for coupling via Ethernet), cellular communication components, NFC components, Bluetooth® components (e.g., Bluetooth® Low Energy), Wi-Fi® components, and other communication components.

Instructions 550 may comprise software, a program, an application, an applet, an app, or other executable code for causing at least any of the processors 510 to perform any one or more of the methodologies discussed herein. The instructions 550 may reside, completely or partially, within at least one of the processors 510 (e.g., within the processor's cache memory), the memory/storage devices 520, or any suitable combination thereof. Furthermore, any portion of the instructions 550 may be transferred to the hardware resources 500 from any combination of the peripheral devices 504 or the databases 506. Accordingly, the memory of processors 510, the memory/storage devices 520, the peripheral devices 504, and the databases 506 are examples of computer-readable and machine-readable media.

The hardware resources 500 and/or hypervisor 502 may be implemented in any of the devices discussed with regard to FIG. 1. In various embodiments, the hardware resources 500 may be implemented in or by one or more app servers (for example, application server 130) in order to provide various services to RE 200R. In such embodiments, one or more app servers 130 may be operated by a notifying authority, an RAP/DoC provider, and/or a RadioApp Store. Services of the notifying authority may include assessment and tracking of REs and/or RAPS. The RAP/DoC Provider entity may be an aggregate of a Conformity Contact Entity (CCE), an OEM, and a software manufacturer for each RE type (for example, product type or platform type). Services of the CCE may include determining DoC compliance for the OEM in relation with software manufacturers. The services of the software manufacturer may include developing RAPs for use by REs (for example, the software manufacturer may be a RAP provider).

Services of the RadioApp Store entity may include distributing RAPs for one or more RAP/DoC providers. In some embodiments, the RadioApp Store may include a DoC Provisioning Entity (DPE) that is responsible for DoC endorsement; a DoC Endorsement Function (DEF) that is responsible for digitally signing the DoC; a RAP provisioning entity, responsible for endorsement of RAPs; a RAP Endorsement Function (REF) that is responsible for digitally signing RAPs; and an RE Management Entity (RME) that may support remote attestation (for example, RE configuration enforcement and RE certificate verification) and RE monitoring. In embodiments where the hardware resources 500 is employed as a RadioApp Store, the hardware resources 500 may be configured to perform the processes described herein (or parts thereof), such as the process shown and described with regard to FIGS. 6-7 and 9. In other embodiments, any other entity may provide RAs/RAPs to REs using a variety of procedures, including direct provisioning from an RE manufacturer to target RE(s), D2D or ProSe-based provisioning, per-mass provision (for example, all devices of a given type), multi-point provisioning (for example, device-to-multiple-devices), and/or the like.

FIGS. 6-9 illustrate processes 600-900, respectively, for providing the CDI technology of the present disclosure, according to various embodiments. For illustrative purposes, the operations of processes 600-900 are described as being performed by the various elements as described with respect to FIGS. 1-5 and/or between the various elements discussed with respect to FIGS. 1-5. Some of the process 600-900 may include communications between various devices, and it should be understood that such communications may be facilitated by the various circuitry as described with regard to FIGS. 1-5 using the various messages/protocols discussed previously. Moreover, while particular examples and orders of operations are illustrated in FIGS. 6-9, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Referring to FIG. 6, a process 600 for downloading and installing a RAP 470 in accordance with various embodiments, is shown. Process 600 may begin at operation 603 where the admin 402 may send a RAP request (DownloadRAPReq) signal including a RAP identifier (ID) to the RadioApp Store 601. The RAP request may be based on a selection of the RAP 470 by the user of the RE 200R in a graphical user interface (GUI)-based AppStore platform. In embodiments, the RAP request may include a DoC ID or the applicable DoC itself. Additionally or alternatively, the RAP request may include an RE ID (for example, a serial number or unique ID of the RE 200R) or an RE type ID of the RE 200R. The RE type ID may be a combination of a hardware platform ID and an OEM ID, which may be provisioned in the RE 200R according to known procedures.

At operation 605, the RadioApp Store 601 may determine whether the requested RAP 470 is suitable for implementation by the RE 200R. In embodiments, the RadioApp Store 601 may verify that the RE 200R is compatible with the requested RAP 470. In one example, determining compatibility may include determining whether the RA is designed to be operated on the RE 200R, and/or determining whether there is a DoC covering the joint operation of the RA/RAP 470 in combination with the RE 200R. In embodiments, the RadioApp Store 601 may determine that the RA/RAP 470 is compatible with the RE 200R only if both conditions are met (for example, the RadioApp Store 601 should determine that the RAP 470 is compatible with the RE 200R and that the DoC covers the joint operation of the RE 200R together with the RA 470), and when both conditions are met, then the requested RAP 470 may be delivered to the RE 200R at operation 608. In another example, determining compatibility may include determining whether the RA/RAP 470 is permitted to be implemented by the RE 200R in combination with other RAs 470 that are currently installed on and/or operated by the RE 200R.

At operation 608, the admin 402 may receive a download RAP confirmation (DownloadRAPCnf) signal including the RAP ID and the RAP (URA) 470 from the RadioApp Store 601. In embodiments, the RAP 470 included with the DownloadRAPCnf may be in the form of source codes or configcodes as discussed previously. In some embodiments, the RAP 470 may be protected such that only a target RE type (for example, all REs 200R having the same platform or hardware architecture) or a target RE instance (for example, a specific RE 200R with a unique ID, serial number, etc.) can recover the original RAP 470, for example, through encryption using, inter alia, the RE ID or RE type ID to decrypt the RAP 470. In such embodiments, the RadioApp Store 601 may encrypt and/or digitally sign the RAP 470 using, for example, a private key of the RadioApp Store 601. The private key may be generated using the RE ID for the RE instance (for example, the serial number or unique ID) or an RE type ID of the RE 200R alone or in combination with other suitable key generation elements, such as a concatenation, nonce, hardware/signal measurement, and/or any other like alphanumeric representation or sequence. The RAP 470 may be digitally signed where, for example, a hashcode may be calculated by the sending party (for example, the RadioApp Store 601) and encrypted using the private key of sender. The digital signature may be a document or package including both the original unencrypted RAP 470 and the encrypted hashcode.

At operation 610, the admin 402 may send a request to create a RAP 470 entity to the MPM 403, and at operation 615, the MPM 403 may create the RAP 470 entity in secure storage for storage of the RAP 470 source code or configcodes. In embodiments, the RE ID or the RE type ID may be used as a nonce for storing the RAP 470 in the secure storage.

At operation 613, the admin 402 may send a RAP installation request (InstallRAReq) signal including the RAP ID to the CM 411 to request installation of the RAP 470. At operation 618, the CM 411 may perform a RAP (URA) code certification procedure in order to verify RAP (URA) compatibility, authentication, etc.

As discussed previously, the delivered RAP 470 may be encrypted by the RadioApp Store 601, and in such embodiments, the CM 411 (or some other element of the RE 200R) may decrypt the RAP 470 as part of the RAP code certification procedure. In such embodiments, the CM 411 may use the RE ID or RE type ID as the decryption key or a portion of the decryption key. Additionally, the certification process may include verifying the authenticity to ensure that the RAP 470 was in fact provided by the RadioApp Store 601. The certification process may also include verifying the integrity of the RAP 470 to ensure that the RAP 470 was not altered during the delivery process. An example authenticity and integrity verification procedure is shown and described with regard to FIG. 7.

Furthermore, according to various embodiments, the certification procedure may also include verifying that the RA component of the RAP 470 may be implemented by the RE 200R. In some embodiments, this may include inter alia, determining whether the DoC authorizes the RA component to be installed in the RE 200R; determining whether the DoC authorizes the RA component to be operated in combination with one or more other RAs 470 already installed in the RE 200R; determining whether an installation order indicated by the DoC authorizes the RA component to be installed in the RE 200R based on an order of installation of one or more other currently installed RAs 470; and/or the like.

In order for the CM 411 (or some other entity of the RE 200R) to verify whether the RA component may be implemented by the RE 200R, the CM 411 may access the DoC 481. In some embodiments, the DoC may be included in the DownloadRAPCnf signal/message obtained at operation 608, or in another suitable message separate from the DownloadRAPCnf signal/message. Once obtained, the DoC may be stored in the secure storage at operations 610 and 615. In such embodiments, the CM 411 may access the DoC from the secure storage using the RE ID or RE type ID.

In other embodiments, a pointer or other location ID of a resource storing the DoC (e.g., a remote computer system/server, distributed database system, etc.) may be provided or indicated by the DownloadRAPCnf signal/message obtained at operation 608 or in the other suitable message separate from the DownloadRAPCnf signal/message. The pointer or location ID may be a uniform resource locator (URL), a network socket descriptor, internet protocol (IP) address, port number, and/or the like. In such embodiments, the CM 411 may access the DoC via the admin 402 by accessing the resource storing the DoC using the pointer/location ID. Additionally, accessing the DoC may require providing the DoC resource with the RE ID, RE type ID, or an RE-specific code (for example, username/password, RE certificate, a random number provided in the DownloadRAPCnf, and the like).

If the downloaded RAP (URA) 470 is an IR, at operation 620 the CM 411 may send a compile request (CompileReq) signal including the RAP ID to the compiler 472. At operation 62, the compiler 472 may compile the RAP 470. After completion of compilation, at operation 625 the compiler 472 may transfer a compile confirmation (CompileCnf) signal including the RAP ID to the CM 411. At operation 628, the CM 411 may perform certification of the compiled RAP (URA) code. After the RAP (URA) code certification procedure is successfully completed, RAP (URA) installation may take place.

At operation 630, the CM 411 sends an installation request (InstallRAReq) signal including the RAP ID to the MPM 403 (also referred to as a "File Manager" or "FM") to perform installation of RAP (URA) 470.

At operation 633, the MPM 403 performs installation of RAP (URA), and at operation 635, the MPM 403 transfers an installation confirmation (InstallRACnf) signal including the RAP (URA) ID to the CM 411. At operation 638 the CM 411 may transfer the InstallRACnf signal including the RAP (URA) ID to the admin 402. In case of installation failure, the CM 411 may report failure of RA (URA) installation using an InstallRAFailCnf signal including the RAP ID and a reason for the failure.

Referring to FIG. 7, a process 700 for creating a digital signature and authenticating and verifying the digital signature in accordance with various embodiments, is shown. Process 700 is a cryptographically based signature assurance scheme and is used in the context of public key infrastructure (PKI) schemes in which a public key used in the signature scheme is tied or bound to an RE 200R and/or an RA 470 by a digital identity certificate issued by a certificate authority. Process 700 may be used to provide an RE 200R with assurance that a RAP 470 is obtained from a trusted source and that the DoC 481 of the RE 200R is a true statement of the legality of the device. In this regard, the RE 200R may use process 700 to verify the RAP's integrity and the authenticity of the source (for example, the RadioApp Store 601), and that the RAP 470 has been allowed on their specific RE 200R by verifying the attestation of the RE manufacturer.

Referring now to FIG. 7, process 700 may begin at operation 1 where the RadioApp Store 601 (or other DoC/RAP providing entity) may calculate a cryptographic hash 780, for example, by using a package or document 781 as an input to a hash function (for example, SHA-3 and/or the like). The document 781 may be a DoC 481 or a RAP 470. At operation 2, the RAS 601 may generate an encrypted hashcode 782 by encrypting the hashcode 780 using a private key of the RadioApp Store 601. At operation 3, the RAS 601 may generate a digital signature 710 (also referred to as a "DoC signature 710", an "attribute signature 710", and the like) by packaging the (unencrypted and unhashed) document 781 with the encrypted hashcode 782. In some embodiments, the digital signature 710 may also include a public key 715 of the signer, while in other embodiments, the public key 715 may be provided separate from the digital signature 710.

At operation 4, the RAS 601 may provide the digital signature 710 to the RE 200R. When the document 781 is the RAP 470, the digital signature 710 may be obtained by the RE 200R in the DownloadRAPCnf signal/message. When the document 781 is the DoC 481, the digital signature 710 may be obtained by the RE 200R in the DownloadRAPCnf signal/message, or the digital signature 781 may be obtained from a remote system (for example, the RadioApp Store 601 or other like entity) using a pointer or location ID, for example, a URL, etc., and providing the remote system with an RE ID, RE type ID, and/or the like. In some embodiments, the digital signature may include two documents 781, wherein a first document 781 is the RAP 470 and a second document 781 is the DoC 481. Once received, at operation 5 the RE 200R may extract the document 781 from the digital signature 710 and may calculate the hashcode 780 by hashing the document 781. At operation 6, the RE 200R may decrypt the encrypted hashcode 780 using a public key 715 of the sender (for example, the RadioApp Store 601). At operation 7, the RE 200R may compare the hashcode 780 calculated using the DoC 481 with the decrypted hashcode 780. If the two values do not match, then the document 781 may have been changed after signing or the digital signature may not have been generated using the private key of the sender. In this way, the hashcode 780 calculated from the document 781 may provide proof of integrity of the document 781, and the encryption of the hashcode 780 with the sender's private key may provide proof of authenticity of identity of the source/sender. In this way, the document 781 may be considered to be bound to the public key of the sender.

In various embodiments, the public key (or portions thereof) of the sender may include or be based on an RE type ID (for example, a unique identifier for a particular type of device or equipment). In such embodiments, the document 781 (for example, either the DoC 481 or the RAP 470) may be considered to be bound to an RE type. In various embodiments, the public key (or portions thereof) of the sender may include or be based on an RE ID (for example, a unique identifier for a particular device, such as a serial number). In such embodiments, the document 781 (for example, either the DoC 481 or the RAP 470) may be considered to be bound to an RE instance.

FIG. 8 illustrates a process 800 for obtaining and installing an RAP 470, in accordance with various embodiments. In embodiments, process 800 may be performed by an RE, such as RE 200R discussed previously.

Process 800 may begin at operation 805 where RF circuitry 206 of the RE 200R may transmit a request for an RA component 470 to the RadioApp Store 601. The RA component 470 may be any type of software component(s) that affects the compliance of an RE to the essential requirements to a regulatory framework, such as the EU's Radio Equipment Directive. As an example, the requested RA component 470, when installed, may implement a novel intelligent antenna element 210 selection scheme. The selection of the RA component 470 may be based on a detected selection in a RadioApp Store 601 marketplace platform via an application running in the application circuitry 202. The request may be included in a message, and in some embodiments, the message may further include an applicable DoC 481 or a DoC ID that identifies the applicable DoC 481. Additionally or alternatively, the message may include an RE ID or an RE type ID.

Figure 9:
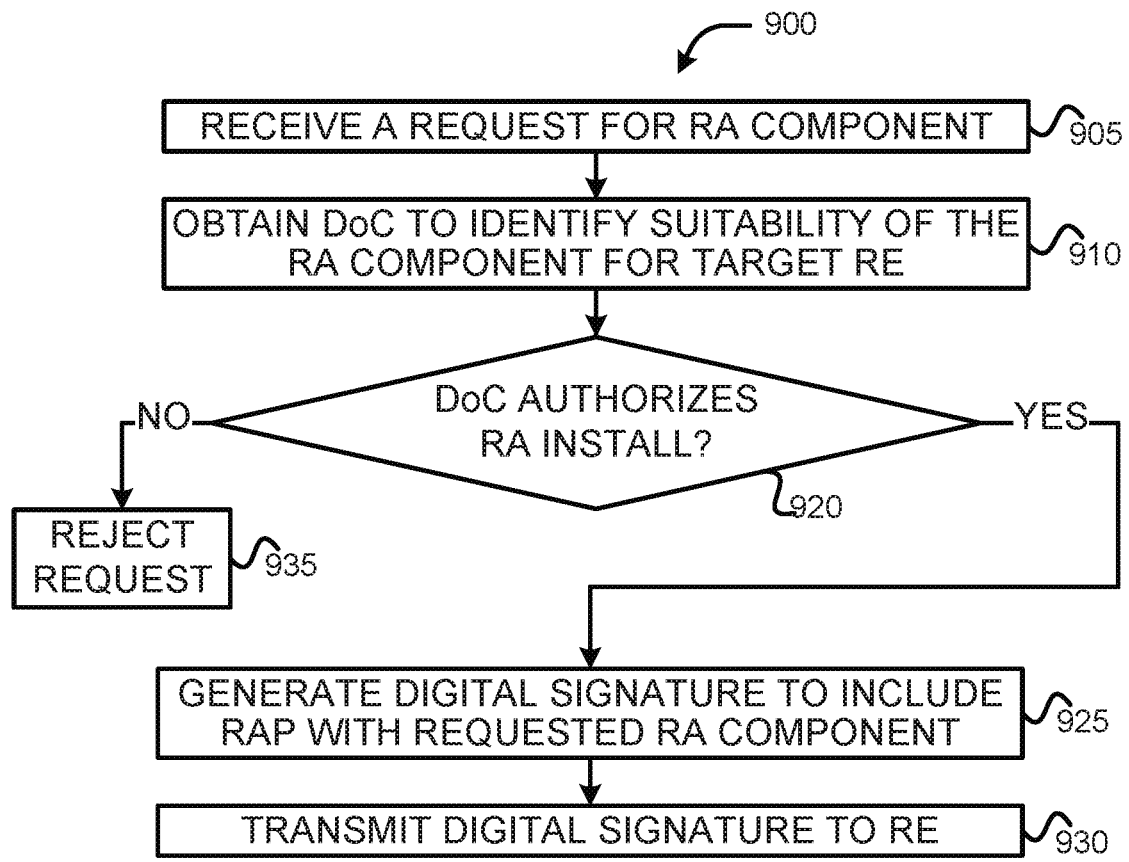
FIG. 9 illustrates an example process for providing a radio application package to a reconfigurable radio equipment, in accordance with various embodiments.

At operation 810, the RF circuitry 206 of the RE 200R may receive a RAP including the RA component 470 when the RA component 470 is verified as being compatible with the RE 200R (see for example, operation 920 shown and described with regard to FIG. 9). In embodiments, if the RAP is included in an encrypted message, then the baseband circuitry 204 may decrypt the message using a key that is based on the binding of the RAP and/or RA component 470. In one example where the RA component 470 is bound to a device type or model type of the RE 200R, then the baseband circuitry 204 may use a decryption key that is based on an RE type ID of the RE 200R. In another example, where the RA component 470 is bound to an instance of the RE 200R, then the baseband circuitry 204 may use a decryption key that is based on an RE ID of the RE 200R. Such a decryption key may be generated according to known techniques using the RE type ID or RE ID in combination with other data.

Once decrypted, the baseband circuitry 204 may store the RAP in a secure storage using a nonce based on the binding. The nonce may be a value, string, data structure, etc. that is used to retrieve the RAP from the secure storage. In one example where the RA component 470 is bound to a device type or model type of the RE 200R, then the baseband circuitry 204 may use the RE type ID of the RE 200R as the nonce. In another example, where the RA component 470 is bound to an instance of the RE 200R, then the baseband circuitry 204 may use the RE ID of the RE 200R as the nonce. The nonce may be generated according to known techniques using the RE type ID or RE ID in combination with other data.

At operation 815, the baseband circuitry 204 may verify the authenticity and integrity of the received RAP. Operation 815 may be the same or similar to the process 700 of FIG. 7. At operation 820, the baseband circuitry 204 may determine whether the authenticity and integrity of the RAP has been properly verified. If at operation 820 the baseband circuitry 204 does not properly verify the authenticity and/or the integrity of the RAP, then the baseband circuitry 204 may proceed to operation 835 to discard the received RAP. If at operation 820 the baseband circuitry 204 does properly verify the authenticity and integrity of the RAP, then the baseband circuitry 204 may proceed to operation 825 to obtain the applicable DoC 481.

At operation 825, the DoC 481 related to the RA component 470 and/or the RE 200R may be obtained. In embodiments where the DoC 481 is stored in the secure storage of the RE 200R, the baseband circuitry 204 may obtain the DoC 481 from the secure storage. In embodiments where the DoC 481 is provided by the RadioApp Store 601, the DoC 481 may be obtained from a message including the RAP, which was received at operation 810. In embodiments where the DoC 481 is stored at a remote resource, such as at an app server 130 associated with the DoC/RAP providing entity, the baseband circuitry 204 may control the RF circuitry 206 to obtain the DoC 481 from the remote resource. This may be done using a location ID or pointer provided with the RAP at operation 810. In such embodiments, the RE 200R may be required to provide the RE type ID or RE ID, depending on the binding, to the remote resource in order to obtain the DoC 481.

At operation 830, the baseband circuitry 830 may determine whether the DoC 481 authorizes installation of the RA component 470. In some embodiments, the DoC 481 may grant independent implementation and/or installation order of the received RA component 470 where, for example, the radio computer circuitry 400 provides an independent execution environment for individual RA components 470 (for example, individual RVMs 471).

Alternatively, the baseband circuitry 204 may only install the RA component 470 (at operation 840) if the DoC 481 explicitly authorizes usage of the RA component 470 in combination with other installed RA components 470. In some embodiments, installation and/or configuration order of RA components 470 must be authorized by the DoC 481, which may need to be provided to the RE 200R during the installation process for the received RA component 470.

In embodiments where the DoC requires authorization for usage of the RA component 470 with already installed components and/or a specific installation and/or configuration order, a list, table, or other data structure may be provided to the Re 200R that indicates the requirements. In some embodiments, this list, table, or other data structure may be included with or indicated by the DoC 481 itself, while in other embodiments, the list, table, or other data structure may be separate from the DoC 481. If the list, table, or other data structure is separate from the DoC 481, the list, table, or other data structure may be included with the configuration information (metadata) of the received RAP, or the list, table, or other data structure may be obtained from the remote resource in a same or similar manner as discussed previously. A first example of such lists, tables, or other data structures is shown by table 1.

TABLE 1

| Equipment Identifier | 1st installed RA | 2nd installed RA | 3rd installed RA |
|---|---|---|---|
| "equipment-type-ID" | ID-RA_A | | |
| | ID-RA_B | | |
| | ID-RA_C | | |
| | ID-RA_A | ID-RA_B | ID-RA_C |
| | ID-RA_A | ID-RA_B | |
| | ID-RA_A | ID-RA_C | |
| | ID-RA_B | ID-RA_C | |

In the first example, the equipment identifier may be an "equipment-type-ID", which may indicate that the RA components and/or the DoC 481 itself are bound to a specific RE type (for example, an RE type ID and the like). In this example, all three RA components 470 (for example, ID-RA_A, ID-RA_B, and ID-RA_C) may be installed and used simultaneously, but only in the specific installation order indicated by table 1. For example, as shown by table 1, ID-RA_A may be installed before either ID-RA_B or ID-RA_C, and ID-RA_B may be installed prior to ID-RA_C, but ID-RA_C cannot be installed prior to ID-RA_A or ID-RA_B.

A second example of such lists, tables, or other data structures is shown by table 2.

TABLE 2

| Equipment Identifier | 1st installed RA | 2nd installed RA | 3rd installed RA |
|---|---|---|---|
| "equipment-instance-ID" | ID-RA_A | | |
| | ID-RA_B | | |
| | ID-RA_C | | |
| | ID-RA_A | ID-RA_B | |
| | ID-RA_A | ID-RA_B | |
| | ID-RA_A | ID-RA_C | |
| | ID-RA_B | ID-RA_C | |

In the second example, the equipment identifier may be an "equipment-instance-ID", which may indicate that the RA components and/or the DoC 481 itself are bound to a specific RE instance (for example, an RE ID or some other suitable instance specific value). In this example, all three RA components 470 (for example, ID-RA_A, ID-RA_B, and ID-RA_C) may be installed independent of one another or simultaneously, but only in a specific installation order indicated by table 2. For example, as shown by table 2, ID-RA_A may be installed before either ID-RA_B or ID-RA_C, but ID-RA_C cannot be installed prior to ID-RA_A or ID-RA_B. In this example, all three RA components 470 may not be used simultaneously.

Other information may be included in the lists, tables, or other data structures in addition to the information provided in the first and second examples. For example, hashcodes for integrity checks; source indications, identifiers, tags, etc.; DoC IDs; and/or other like information. Furthermore, the information provided in the lists, tables, or other data structures may be machine-readable data or codes. In one embodiment, the information in each field of tables 1 and 2, including both the header and body fields, may include a start indicator (for example, a "#" symbol) and a stop indicator (for example, a "@" symbol). For example, a header element may be represented by "#Equipment Identifier@" and the like and a body element may be represented by "#"equipment-instance-ID"@", "#ID-RA_A@", and the like. Any suitable characters or values may be used for the start and stop indicators in other embodiments.

If at operation 830 the baseband circuitry 204 determines that the DoC 481 does not authorize installation of the RA component 470, then the baseband circuitry 204 may proceed to operation 835 to discard the received RAP. If at operation 830 the baseband circuitry 204 determines that the DoC 481 does authorize installation of the RA component 470, then the baseband circuitry 204 may proceed to operation 840 to install the RAP 840, which may then be executed. After completion of operation 835 or 840, process 800 may end or repeat as necessary.

FIG. 9 illustrates a process 900 for providing a RAP to an RE 200R, in accordance with various embodiments. In embodiments, process 900 may be performed by a computer device that includes, for example, hardware resources 500 discussed previously. Additionally, such a computer device may implement/operate a RadioApp Store 601 or other like entity. Process 900 may begin at operation 905 where communication resources 530 of the computer device may receive a request for an RA component 470 from an RE 200R.

At operation 910, the processor circuitry (for example, processor 512, 514 of hardware resource 500) of the computer device may obtain a DoC 481 to identify suitability of the RA component 470 for the target RE 200R. At operation 920, the processor circuitry may determine whether the DoC 481 authorizes installation of the requested RA component 470 in the target RE 200R or a target RE type of the RE 200R. In embodiments, the processor circuitry may analyze the DoC 481 to determine whether the DoC 481 explicitly authorizes usage or installation/configuration order of the RA component 470 in combination with other RA components 470 currently installed or operated by the RE 200R. In embodiments, the DoC 481 may be obtained from a secure storage of the RadioApp Store 601 or obtained from a DoC/RAP providing entity after receipt of the request at operation 905. In some embodiments, the processor circuitry may determine authorization by checking a list, table, or other suitable data structure in a same or similar manner as discussed with regard to operation 830 of FIG. 8. Information regarding the currently installed and/or operated RA components 470 of the RE 200R may be communicated to the RadioApp Store 601 in the request received at operation 601, may be stored in a RadioApp historical database associated with the RadioApp Store 601, or obtained from a core network entity (for example, an HSS 124 when the RE Radio App download or installation information is stored with or in association with RE/UE subscription data, an MME 121 when the RE Radio App download or installation information is stored with or in association with RE/UE capability information and/or the like, or some other core network entity).

If at operation 920 the processor circuitry determines that the DoC 481 does not authorize installation of the requested RA component 470 for the target RE or target RE type, then the processor circuitry may proceed to operation 935 to reject the request. If at operation 920 the processor circuitry determines that the DoC 481 does not authorize installation of the requested RA component 470 for the target RE or target RE type, then the processor circuitry may proceed to operation 925 to generate a digital signature to include a RAP that includes the requested RA component 470 and a generated hashcode, which may be accomplished in a same or similar manner as process 700 of FIG. 7. At operation 930, the communication resources 530 may transmit the digital signature to the RE 200R. After completion of operation 930 or 935, process 900 may end or repeat as necessary.

Some non-limiting examples are provided below.

Example 1 may include one or more computer-readable media, "CRM", including instructions, which when executed by one or more processors, cause a reconfigurable equipment, "RE", to: control transmission, to a radio application store, "RadioApp Store", of a request for a radio application, "RA"; control receipt of the RA from the RadioApp Store when the RA is verified as being compatible with the RE and when implementation of the RA by the RE is authorized by a Declaration of Conformity, "DoC", associated with the RE; and install the RA when the DoC authorizes installation of the RA based on one or more other RAs implemented by the RE.

Example 2 may include one or more CRM of example 1 and/or some other examples herein, wherein the RA is to be used for compliance with requirements of a regulatory framework.

Example 3 may include one or more CRM of example 1 and/or some other examples herein, wherein the RE, in response to execution of the instructions, is to: decrypt the RA using a key comprising an RE identifier, "ID", of the RE when the RA is bound to the DoC via the RE ID; or decrypt the RA using a key comprising an RE type ID of the RE when the RA is bound to the DoC via the RE type ID, wherein the RE type ID is a combination of a hardware platform ID and an original equipment manufacturer, "OEM", ID.

Example 4 may include one or more CRM of example 1 or 3 and/or some other examples herein, wherein, to control transmission of the request, the RE, in response to execution of the instructions, is to: control transmission of a message, which includes the request and further includes the DoC, a DoC ID to indicate the DoC, an RE type ID of the RE, or an RE ID of the RE.

Example 5 may include one or more CRM of example 4 and/or some other examples herein, wherein, to install the obtained RA, the RE, in response to execution of the instructions, is to: generate a key using the RE type ID or the RE ID; decrypt, using the generated key, an RA package, "RAP", including the obtained RA; and control storage, in a secure storage of the RE, the decrypted RAP using the RE type ID or the RE ID as a nonce, wherein the nonce is a code to be used for retrieval of the decrypted RAP from the secure storage.

Example 6 may include one or more CRM of example 5 and/or some other examples herein, wherein the RE, in response to execution of the instructions, is further to: obtain a digital signature from the RadioApp Store, the digital signature comprising a document and an encrypted hashcode, wherein the encrypted hashcode is encrypted using a private key of the RadioApp Store; calculate a first hash of the document; decrypt, using a public key of the RadioApp Store, the encrypted hashcode; and declare the document to be authentic when the first hash matches the second hash, wherein the document is the DoC or the RAP.

Example 7 may include one or more CRM of example 1 or 6 and/or some other examples herein, wherein the RE, in response to execution of the instructions, is to: control receipt of the DoC prior to receipt of the RA; and control storage of the DoC in a secure storage of the RE.

Example 8 may include one or more CRM of example 7 and/or some other examples herein, wherein the RE, in response to execution of the instructions, is to: provide the RE ID to the remote computer system to access an encrypted version of the DoC from a secure storage of a remote computer system when the RE ID is to bind the DoC with the RA, or provide the RE type ID of the RE to the remote computer system to access the encrypted version of the DoC from thea secure storage of the remote computer system when the RE type ID is to bind the DoC with the RA.

Example 9 may include one or more CRM of example 1 or 8 and/or some other examples herein, wherein, to install the RA, the RE, in response to execution of the instructions, is to: determine an installation order of the one or more other RAs currently implemented by the RE; and install the RA when the determined installation order complies with an installation order defined by the DoC.

Example 10 may include one or more CRM of example 9 and/or some other examples herein, wherein, to install the RA, the RE, in response to execution of the instructions, is to: install the RA when the DoC authorizes operation of the RA in combination with the one or more other RAs currently operated by the RE.

Example 11 may include one or more computer-readable media, "CRM", including instructions, which when executed by one or more processors, cause a computer device to: control receipt, from a radio equipment, "RE", of a request for a radio application package, "RAP"; control transmission of the RAP to the RE when the RAP is verified as being compatible with the RE and when implementation of a radio application, "RA", component of the RAP by the RE is authorized by a Declaration of Conformity, "DoC", associated with the RE.

Example 12 may include one or more CRM of example 11 and/or some other examples herein, wherein the RA component is to be used for compliance with requirements of a regulatory framework.

Example 13 may include one or more CRM of example 11 and/or some other examples herein, wherein the computer device, in response to execution of the instructions, is to: encrypt the RAP using a key comprising an RE identifier, "ID", of the RE when the RA component is bound to the DoC via the RE ID; or encrypt the RAP using a key comprising an RE type ID of the RE when the RA component is bound to the DoC via the RE type ID, wherein the RE type ID is a combination of a hardware platform ID and an original equipment manufacturer, "OEM", ID.

Example 14 may include one or more CRM of example 11 or 13 and/or some other examples herein, wherein the request is included in a message that further includes the DoC, a DoC ID to indicate the DoC, an RE type ID of the RE, or an RE ID of the RE.

Example 15 may include one or more CRM of example 14 and/or some other examples herein, wherein the computer device, in response to execution of the instructions, is to: identify a key that is based on the RE type ID or the RE ID; and encrypt, using the identified key, the RAP.

Example 16 may include one or more CRM of example 15 and/or some other examples herein, wherein the computer device, in response to execution of the instructions, is further to: calculate a hashcode of a document, wherein the document is the DoC or the RAP; encrypt the hashcode using a private key of the computer device; generate a digital signature comprising the document and the encrypted hashcode; control transmission of the digital signature to the RE.

Example 17 may include one or more CRM of example 16 and/or some other examples herein, wherein, to generate the digital signature, the computer device, in response to execution of the instructions, is to: generate the digital signature to further include a public key of the computer device, wherein the public key is to be used to decrypt the encrypted hashcode.

Example 18 may include one or more CRM of example 11 or 17 and/or some other examples herein, wherein the DoC is to indicate an installation order of an RA component of the RAP and one or more other RAs currently implemented by the RE.

Example 19 may include one or more CRM of example 18 and/or some other examples herein, wherein the DoC is to indicate authorization of an RA component of the RAP in combination with the one or more other RAs currently operated by the RE.

Example 20 may include one or more CRM of example 18 or 19 and/or some other examples herein, wherein the computer device, in response to execution of the instructions, is to: verify that the RA component of the RAP may be implemented by the RE when the DoC authorizes the RA component to be installed in the RE, when the DoC authorizes the RA component to be operated in combination with the one or more other RAs already installed in the RE, or when the installation order indicated by the DoC authorizes the RA component to be installed in the RE based on an order of installation of the one or more other RAs already installed in the RE.

Example 21 may include an apparatus to be employed as a reconfigurable equipment, "RE", the apparatus comprising: radio frequency (RF) circuitry to: transmit, to a radio application store, "RadioApp Store", a request for a radio application package, "RAP"; and receive the RA from the RadioApp Store when the RA is verified as being compatible with the RE and when implementation of the RA by the RE is authorized by a Declaration of Conformity, "DoC", associated with the RE; and baseband circuitry with onboard memory circuitry, the baseband circuitry to execute instructions to install a radio application, "RA", code of the RAP when the DoC authorizes installation of the RA code based on one or more other RAs implemented by the RE.

Example 22 may include the apparatus of example 21 and/or some other examples herein, wherein the RA is to be used for compliance with requirements of a regulatory framework.

Example 23 may include the apparatus of example 21 and/or some other examples herein, wherein the baseband circuitry is to execute the instructions to: decrypt the RA using a key comprising an RE identifier, "ID", of the RE when the RA is bound to the DoC via the RE ID; or decrypt the RA using a key comprising an RE type ID of the RE when the RA is bound to the DoC via the RE type ID, wherein the RE type ID is a combination of a hardware platform ID and an original equipment manufacturer, "OEM", ID.

Example 24 may include the apparatus of example 21 or 23 and/or some other examples herein, wherein the request is included in a message, and the message further includes the DoC, a DoC ID to indicate the DoC, an RE type ID of the RE, or an RE ID of the RE.

Example 25 may include the apparatus of example 24 and/or some other examples herein, wherein, to install the obtained RA, the baseband circuitry is to execute the instructions to: generate a key using the RE type ID or the RE ID; decrypt, using the generated key, an RA package, "RAP", including the obtained RA; and control storage, in a secure storage of the RE, the decrypted RAP using the RE type ID or the RE ID as a nonce, wherein the nonce is a code to be used for retrieval of the decrypted RAP from the secure storage.

Example 26 may include the apparatus of example 25 and/or some other examples herein, wherein: the RF circuitry is to receive a digital signature from the RadioApp Store, the digital signature comprising a document and an encrypted hashcode, wherein the encrypted hashcode is encrypted using a private key of the RadioApp Store, and wherein the document is the DoC or a RAP including the RA; and the baseband circuitry is to execute the instructions to: calculate a first hash of the document; decrypt, using a public key of the RadioApp Store, the encrypted hashcode; and declare the document to be authentic when the first hash matches the second hash.

Example 27 may include the apparatus of example 26 and/or some other examples herein, wherein: when the document is the DoC, the RF circuitry is to receive the digital signature prior to receipt of the RAP, and the baseband circuitry is to execute the instructions is to store the DoC in a secure storage of the RE.

Example 28 may include the apparatus of example 26 and/or some other examples herein, wherein, when the document is the RAP, the baseband circuitry is to execute the instructions to: provide the RE ID to the remote computer system to access an encrypted version of the DoC from a secure storage of a remote computer system when the RE ID is to bind the DoC with the RA, or provide the RE type ID of the RE to the remote computer system to access the encrypted version of the DoC from thea secure storage of the remote computer system when the RE type ID is to bind the DoC with the RA.

Example 29 may include the apparatus of example 21, 27, or 28 and/or some other examples herein, wherein, to install the RA, the RE, in response to execution of the instructions, is to: determine an installation order of the one or more other RAs currently implemented by the RE; and install the RA when the determined installation order complies with an installation order defined by the DoC.

Example 30 may include the apparatus of example 29 and/or some other examples herein, wherein, to install the RA, the RE, in response to execution of the instructions, is to: install the RA when the DoC authorizes operation of the RA in combination with the one or more other RAs currently operated by the RE.

Example 31 may include an apparatus to be employed as a computer device, the apparatus comprising: processor circuitry to verify a radio application, "RA", component of a radio application package, "RAP", as being compatible with a target reconfigurable equipment, "RE", compatible with one or more RAs currently installed on the target RE, and whether installation of the RA component on the target RE is permitted based on an order of installation of the one or more RAs currently installed on the target RE; and interface circuitry coupled with the processor circuitry, the interface circuitry to: receive, from the target RE, a request for the RA component, and send the RAP to the RE when the RAP is verified as being compatible with the RE, compatible with the one or more RAs currently installed on the target RE, and when the installation of the RA component on the target RE is permitted based on the order of installation.

Example 32 may include the apparatus of example 31 and/or some other examples herein, wherein the compatibility of the RA component with the target RE, compatibility of the RA component with the one or more RAs currently installed on the target RE, and the order of installation is defined by a declaration of conformity, "DoC", or a record associated with the DoC.

Example 33 may include the apparatus of example 32 and/or some other examples herein, wherein the processor circuitry is to: encrypt the RAP using a key comprising an RE identifier, "ID", of the RE when the RA component is bound to the DoC or the record via the RE ID; or encrypt the RAP using a key comprising an RE type ID of the RE when the RA component is bound to the DoC or the record via the RE type ID, wherein the RE type ID is a combination of a hardware platform ID and an original equipment manufacturer, "OEM", ID.

Example 34 may include the apparatus of example 32 or 33 and/or some other examples herein, wherein the request is included in a message that further includes the DoC or the record, a DoC ID to indicate the DoC or a record ID to indicate the record, an RE type ID of the RE, or an RE ID of the RE.

Example 35 may include the apparatus of example 34, wherein the processor circuitry is to: identify a key that is based on the RE type ID or the RE ID; encrypt, using the identified key, the RAP.

Example 36 may include the apparatus of example 31 or 35 and/or some other examples herein, wherein the processor circuitry is to: calculate a hashcode of a document, wherein the document is the DoC or the record or the RAP; encrypt the hashcode using a private key of the computer device; generate a digital signature comprising the document and the encrypted hashcode; control the interface circuitry to transmit the digital signature to the RE.

Example 37 may include the apparatus of example 36 and/or some other examples herein, wherein, to generate the digital signature, the processor circuitry is to: generate the digital signature to further include a public key of the computer device, wherein the public key is to be used to decrypt the encrypted hashcode.

Example 38 may include the apparatus of example 32 or 37 and/or some other examples herein, wherein the DoC or the record is to indicate an installation order of an RA component of the RAP and one or more other RAs currently implemented by the RE.

Example 39 may include the apparatus of example 38 and/or some other examples herein, wherein the DoC or the record is to indicate authorization of an RA component of the RAP in combination with the one or more other RAs currently operated by the RE.

Example 40 may include the apparatus of example 38 or 39 and/or some other examples herein, wherein the RA component is to be used for compliance with requirements of a regulatory framework.

Example 41 may include a method to be performed by a reconfigurable equipment, "RE", the method comprising: transmitting, by the RE to a radio application store, "RadioApp Store", of a request for a radio application, "RA"; receiving, by the RE from the RA from the RadioApp Store, a Radio Application Package including the requested RA when the RA is verified as being compatible with the RE and when implementation of the RA by the RE is authorized by a Declaration of Conformity, "DoC", associated with the RE; and installing, by the RE, the RA when the DoC authorizes installation of the RA based on one or more other RAs implemented by the RE.

Example 42 may include the method of example 41 and/or some other examples herein, wherein the RA is to be used for compliance with requirements of a regulatory framework.

Example 43 may include the method of example 41 and/or some other examples herein, further comprising: decrypting, by the RE, the RA using a key comprising an RE identifier, "ID", of the RE when the RA is bound to the DoC via the RE ID; or decrypting, by the RE, the RA using a key comprising an RE type ID of the RE when the RA is bound to the DoC via the RE type ID, wherein the RE type ID is a combination of a hardware platform ID and an original equipment manufacturer, "OEM", ID.

Example 44 may include the method of example 41 and/or some other examples herein, wherein transmitting the request comprises: transmitting, by the RE, a message, which includes the request and further includes the DoC, a DoC ID to indicate the DoC, an RE type ID of the RE, or an RE ID of the RE.

Example 45 may include the method of example 44 and/or some other examples herein, wherein installing the RA comprises: generating, by the RE, a key using the RE type ID or the RE ID; decrypting, by the RE using the generated key, the RAP; and storing, by the RE in a secure storage of the RE, the decrypted RAP using the RE type ID or the RE ID as a nonce, wherein the nonce is a code to be used for retrieval of the decrypted RAP from the secure storage.

Example 46 may include the method of example 41 and/or some other examples herein, further comprising: obtaining, by the RE, a digital signature from the RadioApp Store, the digital signature comprising a document and an encrypted hashcode, wherein the encrypted hashcode is encrypted using a private key of the RadioApp Store; calculating, by the RE, a first hash of the document; decrypting, by the RE using a public key of the RadioApp Store, the encrypted hashcode; and declaring, by the RE, the document to be authentic when the first hash matches the second hash, wherein the document is the DoC or a RAP including the RA.

Example 47 may include the method of example 41 or 46 and/or some other examples herein, further comprising: receiving, by the RE, the DoC prior to receipt of the RA; and storing, by the RE, the DoC in a secure storage of the RE.

Example 48 may include the method of examples 43-47 and/or some other examples herein, wherein the RE, in response to execution of the instructions, is to: provide the RE ID to the remote computer system to access an encrypted version of the DoC from a secure storage of a remote computer system when the RE ID is to bind the DoC with the RA, or provide the RE type ID of the RE to the remote computer system to access the encrypted version of the DoC from thea secure storage of the remote computer system when the RE type ID is to bind the DoC with the RA.

Example 49 may include the method of example 41 or 48 and/or some other examples herein, wherein installing the RA comprises: determining, by the RE, an installation order of the one or more other RAs currently implemented by the RE; and installing, by the RE, the RA when the determined installation order complies with an installation order defined by the DoC.

Example 50 may include the method of example 49 and/or some other examples herein, wherein installing the RA comprises: installing, by the RE, the RA when the DoC authorizes operation of the RA in combination with the one or more other RAs currently operated by the RE.

Example 51 may include a method to be performed by a computer device to be employed as a radio application store, "RadioApp Store", the method comprising: receiving, by the computer device from a radio equipment, "RE", of a request for a radio application package, "RAP"; transmitting, by the computer device, the RAP to the RE when the RAP is verified as being compatible with the RE and when implementation of a radio application, "RA", component of the RAP by the RE is authorized by a Declaration of Conformity, "DoC", associated with the RE.

Example 52 may include the method of example 51 and/or some other examples herein, wherein the RA component is to be used for compliance with requirements of a regulatory framework.

Example 53 may include the method of example 51 and/or some other examples herein, further comprising: encrypting, by the computer device, the RAP using a key comprising an RE identifier, "ID", of the RE when the RA component is bound to the DoC via the RE ID; or encrypting, by the computer device, the RAP using a key comprising an RE type ID of the RE when the RA component is bound to the DoC via the RE type ID, wherein the RE type ID is a combination of a hardware platform ID and an original equipment manufacturer, "OEM", ID.

Example 54 may include the method of example 51 or 53 and/or some other examples herein, wherein the request is included in a message that further includes the DoC, a DoC ID to indicate the DoC, an RE type ID of the RE, or an RE ID of the RE.

Example 55 may include the method of example 54 and/or some other examples herein, further comprising: identifying, by the computer device, a key that is based on the RE type ID or the RE ID; encrypting, by the computer device, using the identified key, the RAP.

Example 56 may include the method of example 56 and/or some other examples herein, wherein the computer device, in response to execution of the instructions, is further to: calculating, by the computer device, a hashcode of a document, wherein the document is the DoC or the RAP; encrypting, by the computer device, the hashcode using a private key of the computer device; generating, by the computer device, a digital signature comprising the document and the encrypted hashcode; transmitting, by the computer device, the digital signature to the RE.

Example 57 may include the method of example 56 and/or some other examples herein, wherein, to generate the digital signature, the computer device, in response to execution of the instructions, is to: generate the digital signature to further include a public key of the computer device, wherein the public key is to be used to decrypt the encrypted hashcode.

Example 58 may include the method of example 51 or 57 and/or some other examples herein, wherein the DoC is to indicate an installation order of an RA component of the RAP and one or more other RAs currently implemented by the RE.

Example 59 may include the method of example 58 and/or some other examples herein, wherein the DoC is to indicate authorization of an RA component of the RAP in combination with the one or more other RAs currently operated by the RE.

Example 60 may include the method of example 58 or 59 and/or some other examples herein, further comprising: verifying, by the computer device, that the RA component of the RAP may be implemented by the RE when the DoC authorizes the RA component to be installed in the RE, when the DoC authorizes the RA component to be operated in combination with the one or more other RAs already installed in the RE, or when the installation order indicated by the DoC authorizes the RA component to be installed in the RE based on an order of installation of the one or more other RAs already installed in the RE.

Example 61 may include an apparatus to be employed as a reconfigurable equipment, "RE", the apparatus comprising: communication means for transmitting, to a radio application store, "RadioApp Store", a request for a radio application package, "RAP"; and for receiving the RA from the RadioApp Store when the RA is verified as being compatible with the RE and when implementation of the RA by the RE is authorized by a Declaration of Conformity, "DoC", associated with the RE; and processing means for installing a radio application, "RA", code of the RAP when the DoC authorizes installation of the RA code based on one or more other RAs implemented by the RE.

Example 62 may include the apparatus of example 61 and/or some other examples herein, wherein the RA is to be used for compliance with requirements of a regulatory framework.

Example 63 may include the apparatus of example 61 and/or some other examples herein, wherein the processing means is further for decrypting the RA using a key comprising an RE identifier, "ID", of the RE when the RA is bound to the DoC via the RE ID; or decrypting the RA using a key comprising an RE type ID of the RE when the RA is bound to the DoC via the RE type ID, wherein the RE type ID is a combination of a hardware platform ID and an original equipment manufacturer, "OEM", ID.

Example 64 may include the apparatus of example 61 or 63 and/or some other examples herein, wherein the request is included in a message, and the message further includes the DoC, a DoC ID to indicate the DoC, an RE type ID of the RE, or an RE ID of the RE.

Example 65 may include the apparatus of example 64 and/or some other examples herein, wherein the processing means is further for: generating a key using the RE type ID or the RE ID; decrypting, using the generated key, an RA package, "RAP", including the obtained RA; and storing, in a secure storage of the RE, the decrypted RAP using the RE type ID or the RE ID as a nonce, wherein the nonce is a code to be used for retrieval of the decrypted RAP from the secure storage.

Example 66 may include the apparatus of example 65 and/or some other examples herein, wherein: the communication means is for receiving a digital signature from the RadioApp Store, the digital signature comprising a document and an encrypted hashcode, wherein the encrypted hashcode is encrypted using a private key of the RadioApp Store, and wherein the document is the DoC or a RAP including the RA; and the processing means is for: calculating a first hash of the document; decrypting, using a public key of the RadioApp Store, the encrypted hashcode; and declaring the document to be authentic when the first hash matches the second hash.

Example 67 may include the apparatus of example 66 and/or some other examples herein, wherein, when the document is the DoC, the communication means is for receiving the digital signature prior to receipt of the RAP, and the processing means is for storing the DoC in a secure storage of the RE.

Example 68 may include the apparatus of example 66 and/or some other examples herein, wherein, when the document is the RAP, the processing means is for: providing the RE ID to the remote computer system to access an encrypted version of the DoC from a secure storage of a remote computer system when the RE ID is to bind the DoC with the RA, or providing the RE type ID of the RE to the remote computer system to access the encrypted version of the DoC from the secure storage of the remote computer system when the RE type ID is to bind the DoC with the RA.

Example 69 may include the apparatus of example 61, 67, or 68 and/or some other examples herein, wherein the processing means is for: determining an installation order of the one or more other RAs currently implemented by the RE; and installing the RA when the determined installation order complies with an installation order defined by the DoC.

Example 70 may include the apparatus of example 69 and/or some other examples herein, wherein the processing means is for: installing the RA when the DoC authorizes operation of the RA in combination with the one or more other RAs currently operated by the RE.

Example 71 may include an apparatus to be employed as a computer device, the apparatus comprising: processing means for verifying a radio application, "RA", component of a radio application package, "RAP", as being compatible with a target reconfigurable equipment, "RE", compatible with one or more RAs currently installed on the target RE, and whether installation of the RA component on the target RE is permitted based on an order of installation of the one or more RAs currently installed on the target RE; and communication means for: receiving, from the target RE, a request for the RA component, and transmitting the RAP to the RE when the RAP is verified as being compatible with the RE, compatible with the one or more RAs currently installed on the target RE, and when the installation of the RA component on the target RE is permitted based on the order of installation.

Example 72 may include the apparatus of example 71 and/or some other examples herein, wherein the compatibility of the RA component with the target RE, compatibility of the RA component with the one or more RAs currently installed on the target RE, and the order of installation is defined by a declaration of conformity, "DoC", or a record associated with the DoC.

Example 73 may include the apparatus of example 72 and/or some other examples herein, wherein the processing means is for encrypting the RAP using a key comprising an RE identifier, "ID", of the RE when the RA component is bound to the DoC or the record via the RE ID; or encrypting the RAP using a key comprising an RE type ID of the RE when the RA component is bound to the DoC or the record via the RE type ID, wherein the RE type ID is a combination of a hardware platform ID and an original equipment manufacturer, "OEM", ID.

Example 74 may include the apparatus of example 72 or 73 and/or some other examples herein, wherein the request is included in a message that further includes the DoC or the record, a DoC ID to indicate the DoC or a record ID to indicate the record, an RE type ID of the RE, or an RE ID of the RE.

Example 75 may include the apparatus of example 74 and/or some other examples herein, wherein the processing means is for: identifying a key that is based on the RE type ID or the RE ID; encrypting, using the identified key, the RAP.

Example 76 may include the apparatus of example 71 or 75 and/or some other examples herein, wherein the processing means is for calculating a hashcode of a document, wherein the document is the DoC or the record or the RAP; encrypting the hashcode using a private key of the computer device; generating a digital signature comprising the document and the encrypted hashcode, and the communication means is for transmitting the digital signature to the RE.

Example 77 may include the apparatus of example 76 and/or some other examples herein, wherein the processing means is for: generating the digital signature to further include a public key of the computer device, wherein the public key is to be used to decrypt the encrypted hashcode.

Example 78 may include the apparatus of example 72 or 77 and/or some other examples herein, wherein the DoC or the record is to indicate an installation order of an RA component of the RAP and one or more other RAs currently implemented by the RE.

Example 79 may include the apparatus of example 78 and/or some other examples herein, wherein the DoC or the record is to indicate authorization of an RA component of the RAP in combination with the one or more other RAs currently operated by the RE.

Example 80 may include the apparatus of example 78 or 79 and/or some other examples herein, wherein the RA component is to be used for compliance with requirements of a regulatory framework The foregoing description of the above Examples provides illustration and description for the example embodiments disclosed herein, but the above Examples are not intended to be exhaustive or to limit the scope of the invention to the precise form disclosed. Modifications and variations are possible in light of the above teachings and/or may be acquired from practice of various implementations of the invention.

The invention claimed is:

1. One or more non-transitory computer-readable media (NTCRM) including instructions that, when executed by one or more processors, cause a reconfigurable radio equipment, (RE), to:
control transmission, to a radio application store (RadioApp Store) of a request for a radio application (RA);
control receipt of the RA from the RadioApp Store when the RA is verified as being compatible with the RE and when implementation of the RA by the RE is authorized by a Declaration of Conformity (DoC) associated with the RE;
decrypt the RA using a key comprising (i) an RE identifier (ID) of the RE when the RA is bound to the DoC via the RE ID, or (ii) an RE type ID of the RE when the RA is bound to the DoC via the RE type ID, wherein the RE type ID is a combination of a hardware platform ID and an original equipment manufacturer (OEM) ID; and
install the RA based at least on an authorization by the DoC for installation of the RA.

2. The one or more NTCRM of claim 1, wherein, to control transmission of the request, the RE, in response to execution of the instructions, is to:
control transmission of a message, which includes the request and further includes the DoC, a DoC ID to indicate the DoC, an RE type ID of the RE, or an RE ID of the RE.

3. The one or more NTCRM of claim 2, wherein, to install the RA, the RE, in response to execution of the instructions, is to:
generate the key using the RE type ID or the RE ID;
decrypt, using the generated key, an RA package (RAP) including the RA; and
control storage, in a secure storage of the RE, the decrypted RAP using the RE type ID or the RE ID as a nonce, wherein the nonce is a code to be used for retrieval of the decrypted RAP from the secure storage.

4. The one or more NTCRM of claim 1, wherein the RE, in response to execution of the instructions, is further to:
obtain a digital signature from the RadioApp Store, the digital signature comprising a document and an encrypted hashcode, wherein the encrypted hashcode is encrypted using a private key of the RadioApp Store;
calculate a first hash of the document;
decrypt, using a public key of the RadioApp Store, the encrypted hashcode to generate a second hash; and
declare the document to be authentic when the first hash matches the second hash, wherein the document is the DoC or a RAP that includes the RA.

5. The one or more NTCRM of claim 1, wherein the RE, in response to execution of the instructions, is to:
control receipt of the DoC prior to receipt of the RA; and
control storage of the DoC in a secure storage of the RE.

6. The one or more NTCRM of claim 5, wherein the RE, in response to execution of the instructions, is to:
provide the RE ID to a remote computer system to access an encrypted version of the DoC from a secure storage of a remote computer system when the RE ID is to bind the DoC with the RA, or
provide the RE type ID of the RE to the remote computer system to access the encrypted version of the DoC from the secure storage of the remote computer system when the RE type ID is to bind the DoC with the RA.

7. The one or more NTCRM of claim 1, wherein, to install the RA, the RE, in response to execution of the instructions, is to:
determine an installation order of the one or more other RAs currently implemented by the RE; and
install the RA when the determined installation order complies with an installation order defined by the DoC.

8. The one or more NTCRM of claim 7, wherein, to install the RA, the RE, in response to execution of the instructions, is to:
install the RA when the DoC authorizes operation of the RA in combination with the one or more other RAs currently operated by the RE.

9. One or more non-transitory computer-readable media (NTCRM) including instructions, which when executed by one or more processors, cause a computer device to:
control receipt, from a radio equipment (RE) of a request for a radio application package (RAP);
encrypt the RAP using (i) a key comprising an RE identifier (ID) of the RE when the RAP is bound to the DoC via the RE ID, or (ii) a key comprising an RE type ID of the RE when the RAP is bound to the DoC via the RE type ID, wherein the RE type ID is a combination of a hardware platform ID and an original equipment manufacturer (OEM) ID; and
control transmission of the RAP to the RE when the RAP is verified as being compatible with the RE and when implementation of a radio application (RA) component of the RAP by the RE is authorized by a Declaration of Conformity (DoC) associated with the RE.

10. The one or more NTCRM of claim 9, wherein the request is included in a message that further includes the DoC, a DoC ID to indicate the DoC, an RE type ID of the RE, or an RE ID of the RE.

11. The one or more NTCRM of claim 10, wherein the computer device, in response to execution of the instructions, is to:
identify the key that is based on the RE type ID or the RE ID; and
encrypt, using the identified key, the RAP.

12. The one or more NTCRM of claim 9, wherein the computer device, in response to execution of the instructions, is further to:
calculate a hashcode of a document, wherein the document is the DoC or the RAP;
encrypt the hashcode using a private key of the computer device;
generate a digital signature comprising the document and the encrypted hashcode; and
control transmission of the digital signature to the RE.

13. The one or more NTCRM of claim 12, wherein, to generate the digital signature, the computer device, in response to execution of the instructions, is to:
generate the digital signature to further include a public key of the computer device, wherein the public key is to be used to decrypt the encrypted hashcode.

14. The one or more NTCRM of claim 9, wherein the DoC is to indicate an installation order of an RA component of the RAP and one or more other RAs currently implemented by the RE.

15. The one or more NTCRM of claim 14, wherein the DoC is to indicate authorization of an RA component of the RAP in combination with the one or more other RAs currently operated by the RE.

16. The one or more NTCRM of claim 14, wherein the computer device, in response to execution of the instructions, is to:
verify that the RA component of the RAP may be implemented by the RE when the DoC authorizes the RA component to be installed in the RE, when the DoC authorizes the RA component to be operated in combination with the one or more other RAs already installed in the RE, or when the installation order indicated by the DoC authorizes the RA component to be installed in the RE based on an order of installation of the one or more other RAs already installed in the RE.

17. An apparatus to be implemented in reconfigurable equipment (RE) the apparatus comprising:
radio frequency (RF) circuitry to:
transmit, to a radio application store (RadioApp Store) a request for a radio application (RA); and
receive the RA from the RadioApp Store when the RA is verified as being compatible with the RE and when implementation of the RA by the RE is authorized by a Declaration of Conformity (DoC) associated with the RE; and
baseband circuitry with onboard memory circuitry, the baseband circuitry to execute instructions to:
decrypt the RA using a key comprising (i) an RE identifier (ID) of the RE when the RA is bound to the DoC via the RE ID, or (ii) an RE type ID of the RE when the RA is bound to the DoC via the RE type ID, wherein the RE type ID is a combination of a hardware platform ID and an original equipment manufacturer (OEM) ID; and
install the RAP when the RA based at least on an authorization by the DoC for installation of the RA.

18. The apparatus of claim 17, wherein the request is included in a message, and the message further includes the DoC, a DoC ID to indicate the DoC, an RE type ID of the RE, or an RE ID of the RE, and wherein, to install the RA, the baseband circuitry is to execute the instructions to:
generate the key using the RE type ID or the RE ID;
decrypt, using the generated key, an RA package (RAP) including the RA; and
control storage, in a secure storage of the RE, the decrypted RAP using the RE type ID or the RE ID as a nonce, wherein the nonce is a code to be used for retrieval of the decrypted RAP from the secure storage.

19. The apparatus of claim 17, wherein:
the RF circuitry is to receive a digital signature from the RadioApp Store, the digital signature comprising a document and an encrypted hashcode, wherein the encrypted hashcode is encrypted using a private key of the RadioApp Store, and wherein the document is the DoC or a RAP including the RA; and
the baseband circuitry is to execute the instructions to:
calculate a first hash of the document;
decrypt, using a public key of the RadioApp Store, the encrypted hashcode to generate a second hash; and
declare the document to be authentic when the first hash matches the second hash.

20. An apparatus to be implemented in a computer system, the apparatus comprising:
processor circuitry to:
verify a radio application (RA) component of a radio application package (RAP) as being compatible with a target reconfigurable equipment (RE) compatible with one or more RAs currently installed on the target RE, and whether installation of the RA component on the target RE is permitted based on an order of installation of the one or more RAs currently installed on the target RE; and
upon receipt of a request for the RA component from the target RE, encrypt the RAP using (i) a key comprising an RE identifier (ID) of the RE when the RA component is bound to the DoC via the RE ID, or (ii) a key comprising an RE type ID of the RE when the RA component is bound to the DoC via the RE type ID, wherein the RE type ID is a combination of a hardware platform ID and an original equipment manufacturer (OEM) ID; and
interface circuitry coupled with the processor circuitry, the interface circuitry to:
receive, from the target RE, the request for the RA component; and
send the RAP to the RE when the RAP is verified as being compatible with the RE, compatible with the one or more RAs currently installed on the target RE, and when the installation of the RA component on the target RE is permitted based on the order of installation.

21. The apparatus of claim 20, wherein the compatibility of the RA component with the target RE, compatibility of the RA component with the one or more RAs currently installed on the target RE, and the order of installation is defined by a declaration of conformity (DoC) or a record associated with the DoC.

* * * * *